(12) United States Patent
Siegmeth et al.

(10) Patent No.: US 12,037,140 B2
(45) Date of Patent: Jul. 16, 2024

(54) SYSTEM, APPARATUS, AND METHOD FOR INSPECTING AN AIRCRAFT WINDOW

(71) Applicant: The Boeing Company, Chicago, IL (US)

(72) Inventors: Jeff Siegmeth, Bothell, WA (US); Arif Zaman, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 79 days.

(21) Appl. No.: 17/992,264

(22) Filed: Nov. 22, 2022

(65) Prior Publication Data
US 2024/0166374 A1      May 23, 2024

(51) Int. Cl.
| | |
|---|---|
| *B64F 5/60* | (2017.01) |
| *B64C 1/14* | (2006.01) |
| *B64D 11/00* | (2006.01) |
| *B64D 11/06* | (2006.01) |
| *G06T 7/00* | (2017.01) |
| *H04N 7/18* | (2006.01) |
| *H04N 23/698* | (2023.01) |

(52) U.S. Cl.
CPC .............. *B64F 5/60* (2017.01); *B64C 1/1484* (2013.01); *B64D 11/0015* (2013.01); *B64D 11/06* (2013.01); *G06T 7/001* (2013.01); *H04N 7/183* (2013.01); *H04N 23/698* (2023.01)

(58) Field of Classification Search
CPC . G06T 2207/20081; G06T 2207/20084; G06T 7/0004; G06T 2207/30252; G06T 7/001; G06T 7/0002; G06T 17/00; G06T 19/006; G06T 2200/08; USPC ........................................................ 348/130
See application file for complete search history.

(56) References Cited

U.S. PATENT DOCUMENTS

| | | |
|---|---|---|
| 7,880,885 B1 | 2/2011 | Stana et al. |
| 8,510,061 B2 | 8/2013 | Grant et al. |

(Continued)

FOREIGN PATENT DOCUMENTS

| | | |
|---|---|---|
| WO | 2019020299 A1 | 1/2019 |
| WO | 2021063847 A1 | 4/2021 |

(Continued)

OTHER PUBLICATIONS

Malekzadeh, T., et al., "Aircraft Fuselage Defect Detection Using Deep Neural Networks", Accepted as a conference paper at GlobalSIP 2017, Jan. 1, 2017, pp. 1-5.

(Continued)

*Primary Examiner* — Masum Billah
(74) *Attorney, Agent, or Firm* — COATS & BENNETT, PLLC

(57) ABSTRACT

Visual inspection methods, systems, and apparatuses are presented for the in situ visual inspection of aircraft cabin windows installed in an aircraft from within an aircraft cabin, and where access and ability to visually inspect such aircraft cabin windows is otherwise restricted by placement of aircraft cabin fixtures blocking ordinary viewing of such aircraft cabin window from within an aircraft cabin. The visual inspection is conducted by activating an image capturing device of a personal electronic device incorporated into or otherwise in communication with an aircraft cabin fixture positioned adjacent to an aircraft cabin window.

31 Claims, 19 Drawing Sheets

(56) References Cited

U.S. PATENT DOCUMENTS

| | | | |
|---|---|---|---|
| 8,917,312 B1* | 12/2014 | Gleason | G01N 21/958 |
| | | | 382/141 |
| 9,096,323 B1 | 8/2015 | Ray et al. | |
| 9,290,146 B2 | 3/2016 | Breed | |
| 10,509,415 B2 | 12/2019 | Bosworth et al. | |
| 10,654,450 B2 | 5/2020 | Tilleman et al. | |
| 10,710,752 B2 | 7/2020 | Georgeson | |
| 11,049,404 B2 | 6/2021 | Gorsica et al. | |
| 11,107,306 B1 | 8/2021 | Knuffman et al. | |
| 11,119,052 B2 | 9/2021 | Liu et al. | |
| 11,308,604 B2 | 4/2022 | Ortega | |
| 11,354,851 B2 | 6/2022 | Holzer et al. | |
| 2008/0169380 A1* | 7/2008 | Jackson | B64C 1/1492 |
| | | | 244/129.3 |
| 2008/0258010 A1* | 10/2008 | Leon | B64D 15/12 |
| | | | 244/134 F |
| 2019/0096135 A1 | 3/2019 | Dal Mutto et al. | |
| 2021/0073971 A1 | 3/2021 | Yokota | |
| 2021/0129971 A1* | 5/2021 | Brown, Jr. | G01N 21/958 |
| 2021/0164920 A1* | 6/2021 | Liu | G01N 21/8806 |
| 2021/0312203 A1 | 10/2021 | Patzwaldt | |

FOREIGN PATENT DOCUMENTS

| | | |
|---|---|---|
| WO | 2022067047 A1 | 3/2022 |
| WO | 2022093629 A1 | 5/2022 |

OTHER PUBLICATIONS

Ren, Z., et al., "State of the Art in Defect Detection Based on Machine Vision", International Journal of Precision Engineering and Manufacturing—Green Technology, May 26, 2021, pp. 661-691.

Krasnokutsky, E., "Al Visual Inspection for Defect Detection", MobiDev, Jun. 9, 2022, pp. 1-14.

Dogru, A., et al., "Using Convolutional Neural Networks to Automate Aircraft Maintenance Visual Inspection", Aerospace 2020, Dec. 7, 2020, pp. 1-22.

Chooch, "Defect Defection with Computer Vision Whitepaper", Retrieved from the internet: URL: https://chooch.ai/defect-detection-paper/ [retrieved on Jun. 9, 2022], pp. 1-16.

* cited by examiner

SYSTEM, APPARATUS, AND METHOD FOR INSPECTING AN AIRCRAFT WINDOW

TECHNOLOGICAL FIELD

The present disclosure relates generally to the field of aircraft window inspection. More specifically the present disclosure relates to the field of systems, methods, and apparatuses for inspecting installed aircraft windows in situ for the presence and/or absence of anomalies in aircraft windows.

BACKGROUND

Aircraft, and aircraft structures within aircraft (including, for example, aircraft windows, etc.), are designed to exacting standards to meet or exceed very strict regulatory requirements for safety. As part of meeting regulatory requirements, inspection regimens for windows can be necessary.

In addition, windows installed on aircraft are subject to repeated temperature and pressure cycling as the aircraft climbs to cruising altitude, is pressurized, and then descends for landing and is depressurized. Aircraft windows may contain one or more non-critical anomalies, such as, for example, inclusions present from manufacturing and/or nicks, scratches, etc., incurred during aircraft operation. Such anomalies can impact appearance or performance of the aircraft window. Early detection of anomalies can insure that anomaly impact on the aircraft window is minimized.

Unless explicitly identified as such, no statement herein is admitted as prior art merely by its inclusion in the Technological Field and/or Background section(s).

SUMMARY

According to present aspects, a method for inspecting an aircraft window installed on an aircraft in situ is disclosed, with the aircraft defining an aircraft interior and an aircraft exterior, said aircraft window defining an aircraft window interior surface and an aircraft window exterior surface, the method including positioning an aircraft cabin fixture within an aircraft cabin, with the aircraft cabin positioned within an aircraft interior, at least a portion of said aircraft cabin fixture positioned adjacent to and a selected distance from an aircraft window interior surface. The method further includes positioning a personal electronic device adjacent the aircraft cabin fixture, said personal electronic device comprising an image capturing device, with the image capturing device configured to face the aircraft window interior surface. The method further includes activating the image capturing device, with the image capturing device configured to comprise a field of view ranging from about 64 degrees to about 120 degrees as measured from the image capturing device to the aircraft window interior surface, and capturing an image of the aircraft window to form a captured image of the aircraft window.

In another aspect, the captured image comprises a captured photographic image, and the image capturing device comprises a photographic image capturing device.

In another aspect, the method further includes analyzing the captured image of the aircraft window to detect the presence or absence of an anomaly in the aircraft window.

In another aspect, the method further includes remotely activating the image capturing device.

In a further aspect, the image capturing device is in communication with an analyzing subsystem.

In another aspect, the analyzing subsystem includes an accessible memory, with the accessible memory comprising an accessible standard aircraft window image.

In another aspect, the method further includes accessing the accessible standard aircraft window image from the accessible memory, and comparing the captured image of the aircraft window to the accessible standard aircraft window image.

In another aspect, the personal electronic device is in communication with a locating subsystem, and the method further includes determining location of the personal electronic device within the aircraft interior.

In a further aspect, the aircraft window includes a unique aircraft window identifier, with the unique aircraft window identifier including at least one of a RFID chip and a part code, and wherein the method further includes identifying the aircraft window from the unique window identifier.

In another aspect, the method further includes providing an accessible memory, said accessible memory in communication with the personal electronic device, and storing the captured image of the aircraft window within the accessible memory.

In another aspect, the image capturing device is configured to include a digital camera, said digital camera comprising at least one of a wide angle lens and an ultra-wide angle lens.

In a further aspect the method further includes positioning the personal electronic device on the aircraft cabin fixture, with the personal electronic device positioned on the aircraft cabin fixture at a selected distance from the aircraft window interior surface, and with the selected distance from the aircraft window interior surface ranging from about 0.5 to about 6 inches.

According to further aspects, an aircraft cabin fixture includes a personal electronic device, with the personal electronic device configured to face an adjacent aircraft window interior surface, with the personal electronic device comprising an image capturing device, and with the image capturing device configured to face the aircraft window interior surface.

In another aspect, the personal electronic device includes a digital camera, with the digital camera including at least one of a wide angle lens and an ultra-wide angle lens.

In a further aspect, the aircraft cabin fixture includes at least one of an aircraft passenger seat and an aircraft cabin monument.

In another aspect, at least a portion of said aircraft cabin fixture is configured to be positioned adjacent to an aircraft window interior surface, with the personal electronic device configured to be positioned at a selected distance from the aircraft window interior surface, and with the selected distance between the personal electronic device and the aircraft window interior surface ranging from about 0.5 inches to about 6 inches.

In another aspect, the image capturing device is configured to capture a field of view ranging from about 64 degrees to about 120 degrees as measured from the image capturing device to the aircraft window interior surface.

In a further aspect, the personal electronic device is attached to the aircraft cabin fixture.

In another aspect, the personal electronic device is integral with the aircraft cabin fixture.

According to another aspect of the present disclosure, an aircraft includes an aircraft cabin, with the aircraft cabin defined by an aircraft fuselage, and with the aircraft fuselage including an aircraft fuselage interior, with the aircraft cabin including an aircraft window, with the aircraft window including an aircraft window exterior surface and an aircraft window interior surface. The aircraft cabin further includes an aircraft cabin fixture, with the aircraft cabin fixture including at least one of an aircraft passenger seat and an aircraft cabin monument, with at least a portion of the aircraft cabin fixture configured to rest adjacent an aircraft window interior surface, with the aircraft cabin fixture further configured to rest at a selected distance from the aircraft window interior surface, with the selected distance configured to define an inspection space between aircraft cabin fixture and the aircraft window interior surface, with the inspection space configured to accommodate a personal electronic device, and with the personal electronic device configured to face the adjacent aircraft window interior surface. The personal electronic device further includes an image capturing device, with the image capturing device configured to face the aircraft window interior surface.

In a further aspect, the image capturing device comprising a digital camera.

In another aspect, at least a portion of the aircraft cabin fixture is configured to be positioned adjacent an aircraft window interior surface, with the aircraft cabin fixture configured to be positioned at a selected distance from the aircraft window interior surface, and with the selected distance from the aircraft window interior surface ranging from about 0.5 inches to about 6 inches.

In another aspect, the image capturing device is configured to capture field of view ranging from about 64 degrees to about 120 degrees as measured from the image capturing device to the aircraft window interior surface.

In a further aspect, the personal electronic device is attached to the aircraft cabin fixture.

In a further aspect, the personal electronic device is integral with the aircraft cabin fixture.

In another aspect, at least a portion of the aircraft cabin fixture is configured to be positioned adjacent an aircraft window interior surface, with the personal electronic device configured to be positioned at a selected distance from the aircraft window interior surface, and with the selected distance from the aircraft window interior surface ranging from about 0.5 inches to about 6 inches.

Another present aspect is directed to a method for harvesting aircraft window data from an aircraft window installed on an aircraft in situ, with the aircraft window defining an aircraft window interior surface and an aircraft window exterior surface, with the method including positioning an aircraft cabin fixture within an aircraft cabin, with at least a portion of the aircraft cabin fixture positioned adjacent an aircraft window interior surface of an aircraft window, with the aircraft cabin fixture further configured to rest at a selected distance from the aircraft window interior surface, said selected distance configured to define an inspection space between the aircraft cabin fixture and the aircraft window interior surface, with the inspection space configured to accommodate a personal electronic device, with the personal electronic device configured to face the adjacent aircraft window interior surface, said personal electronic device comprising an image capturing device said image capturing device configured to face the aircraft window interior surface. The method for harvesting aircraft window data further includes activating the image capturing device, with the image capturing device configured to capture a field of view ranging from about 64 degrees to about 120 degrees as measured from the image capturing device to the aircraft window interior surface, capturing an image of the aircraft window to form a captured image of the aircraft window; and obtaining aircraft window data from the captured image of the aircraft window, wherein the aircraft window data comprises aircraft window anomaly data, and wherein said aircraft window data is harvested from the aircraft window in situ.

In another aspect, the method for harvesting aircraft window data further includes storing the aircraft window data obtained from the captured image of the aircraft window in an accessible memory, said accessible memory in communication with the personal electronic device, accessing the aircraft window data obtained from the captured image of the aircraft window from the accessible memory, and analyzing the aircraft window data to detect an aircraft window anomaly in the aircraft window.

In another aspect, the method for harvesting aircraft window data further includes generating an aircraft window anomaly warning signal, said aircraft window anomaly warning signal generated in response to detecting an anomaly in the aircraft window, and sending the aircraft window anomaly warning signal to a readout.

In another aspect, the method for harvesting aircraft window data further includes monitoring in real time an aircraft window.

In another aspect, the method for harvesting aircraft window data further includes determining in real time a change in a detected aircraft window anomaly.

The present disclosure is further directed to a system for inspecting an aircraft window installed on an aircraft in situ, with the aircraft window including an aircraft window interior surface and an aircraft window exterior surface, with the system including an aircraft cabin fixture, with the aircraft cabin fixture located within an aircraft cabin, with the aircraft cabin fixture comprising at least one of an aircraft passenger seat and an aircraft cabin monument, with at least a portion of the aircraft cabin fixture configured to rest adjacent an aircraft window interior surface of an aircraft window. The aircraft cabin fixture is configured to rest at a selected distance from the aircraft window interior surface, with the selected distance configured to define an inspection space between aircraft cabin fixture and the aircraft window interior surface, with the inspection space configured to accommodate a personal electronic device, with the personal electronic device configured to face the adjacent aircraft window interior surface. The personal electronic device includes an image capturing device, with the image capturing device configured to face the aircraft window interior surface, and with the image capturing device including a digital camera configured to capture an aircraft window image in situ. The image capturing device is configured to configured to include a field of view ranging from about 64 degrees to about 120 degrees as measured from the image capturing device to the aircraft window interior surface, and the system further includes an analyzing subsystem in communication with the image capturing device, with the analyzing subsystem operable to receive and analyze the aircraft window image.

The features, functions and advantages presented herein can be achieved independently in various aspects or may be combined in yet other aspects, further details of which can be seen with reference to the following description and the drawings.

BRIEF DESCRIPTION OF THE DRAWINGS

Figure 1:
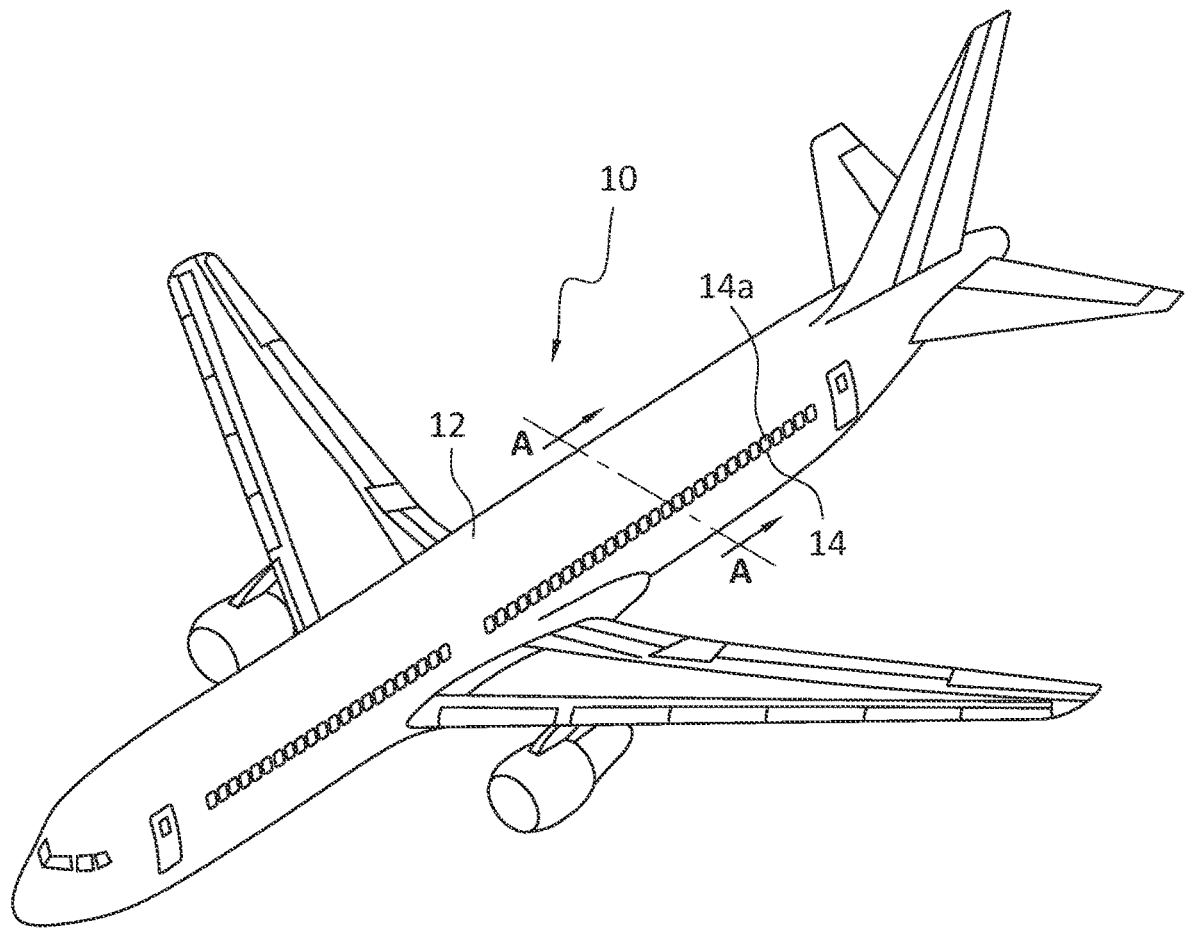
Figure 2:
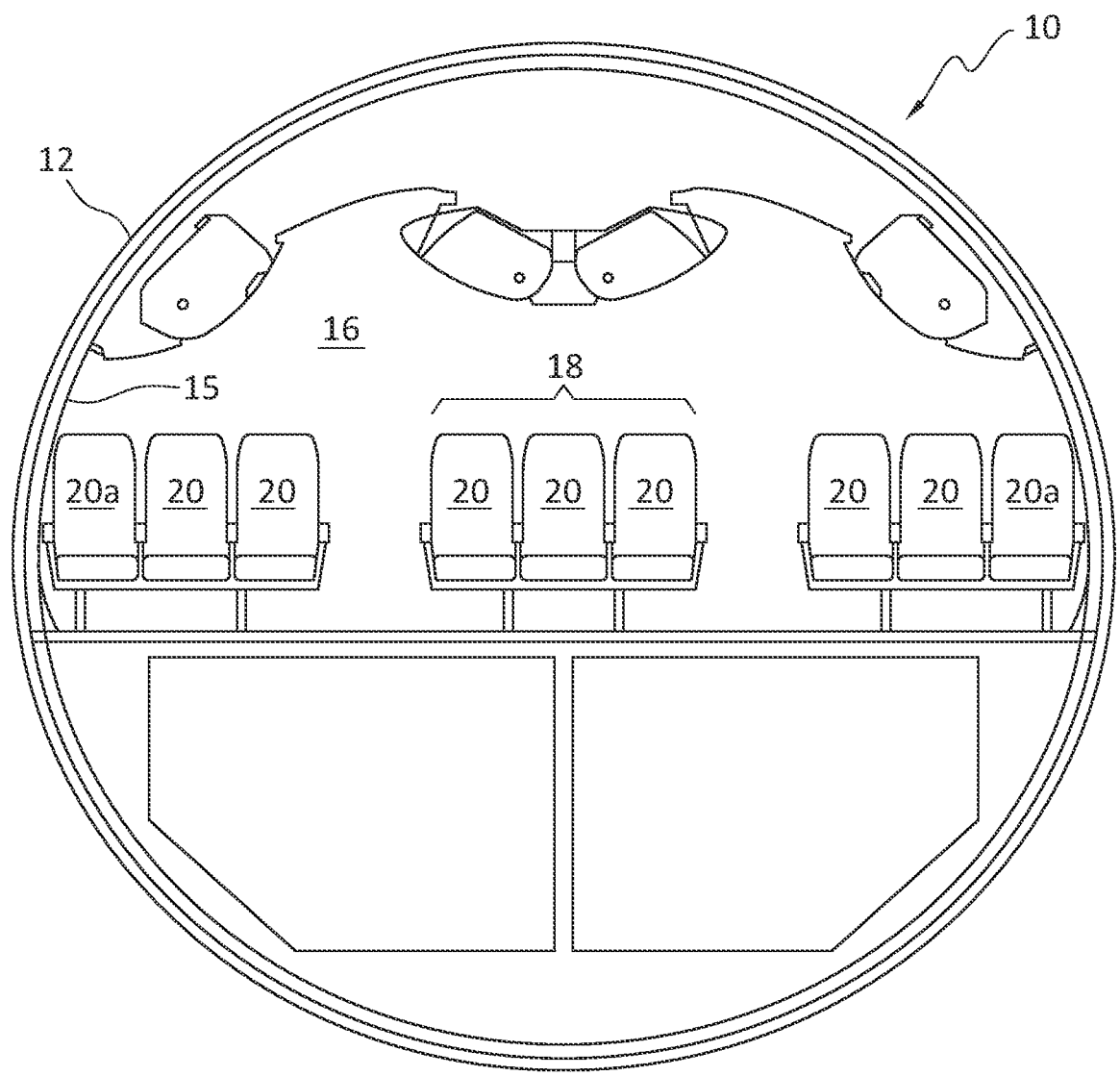
Figure 3:
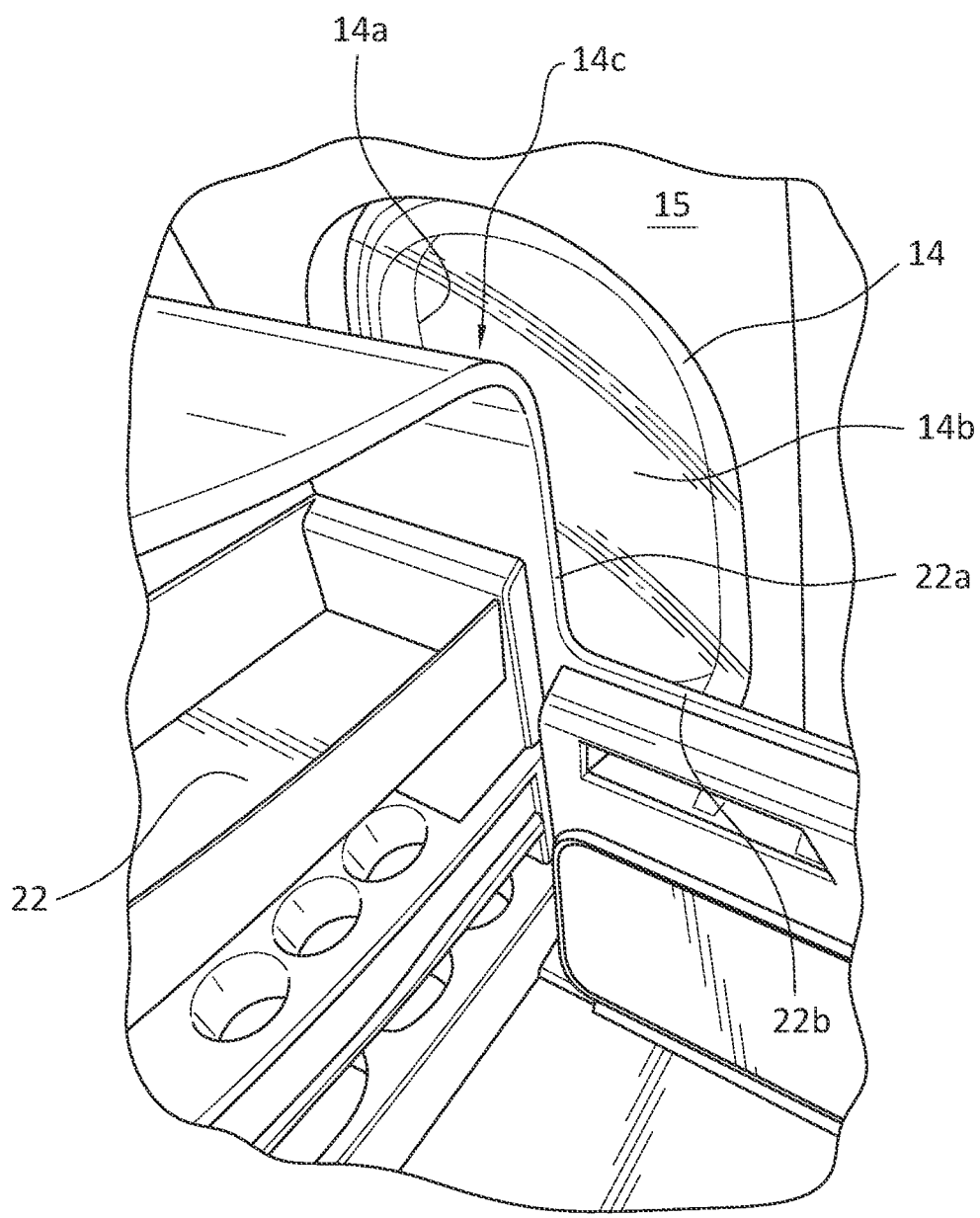
Figures 4A, 5:
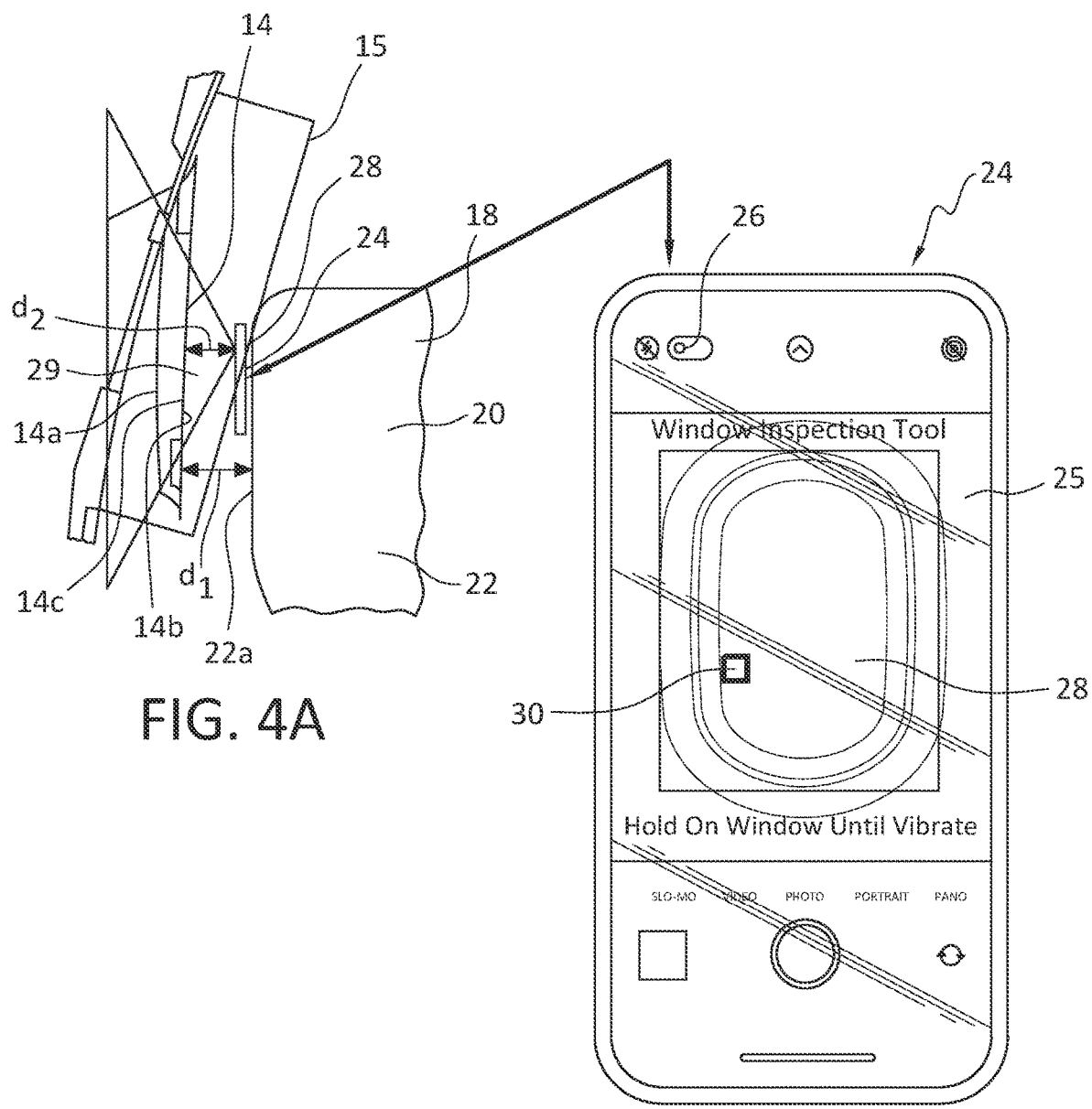
Figure 4B:
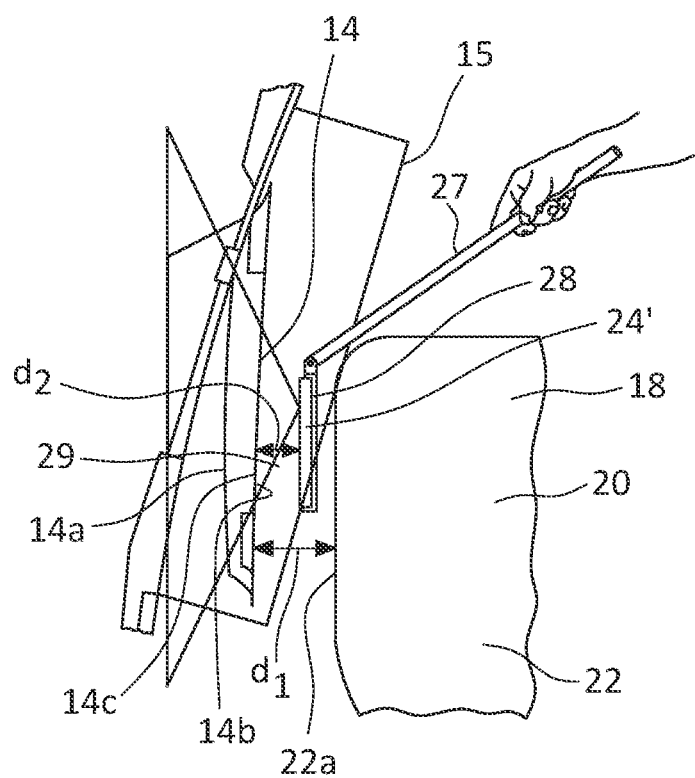
Figure 6:
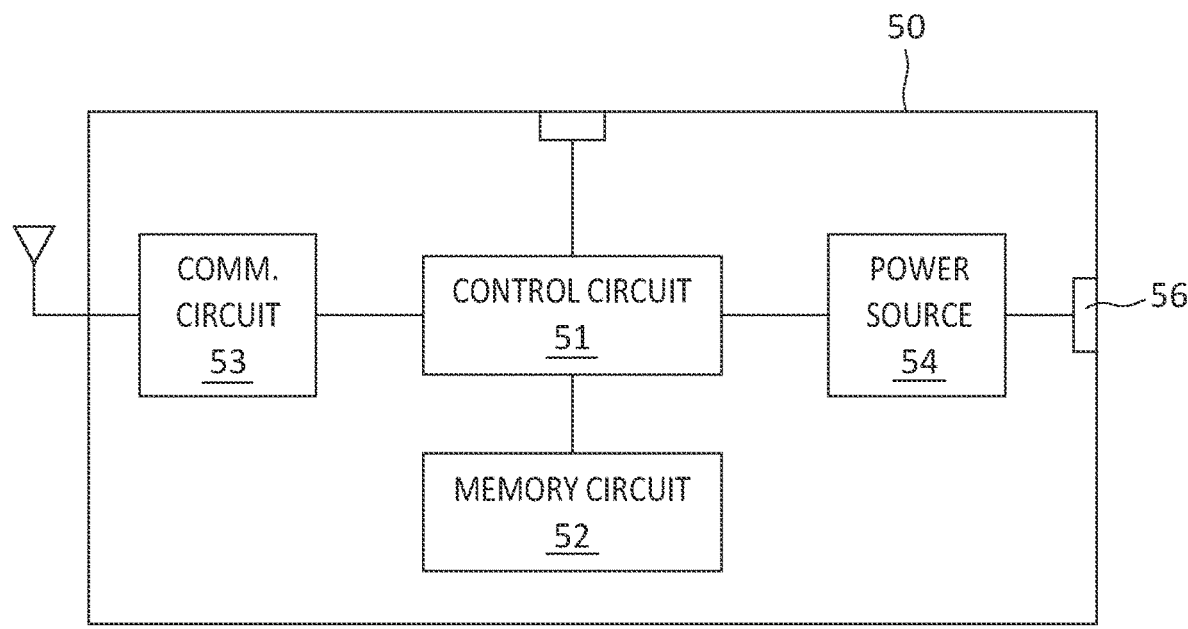
Figure 7:
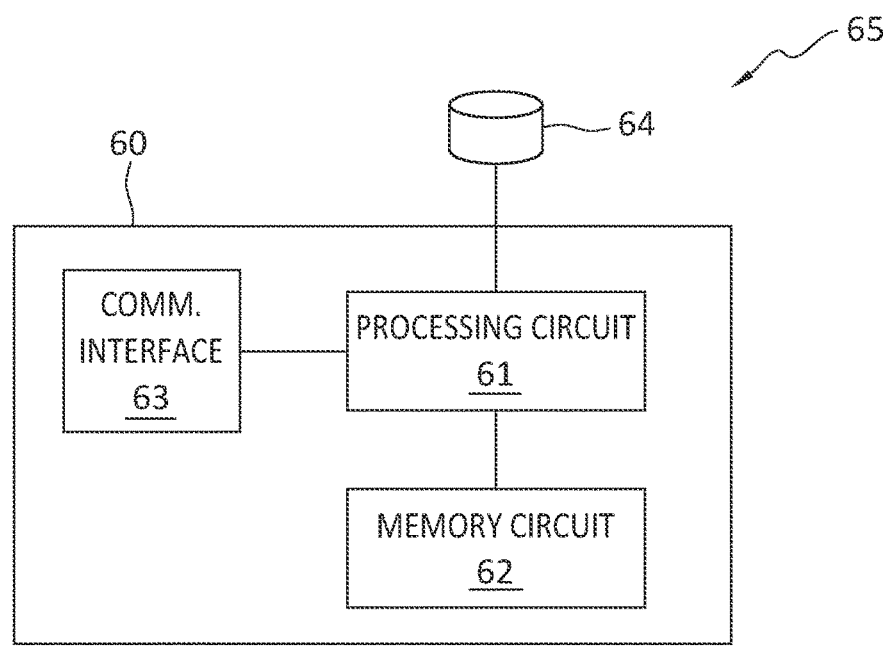
Figure 8:
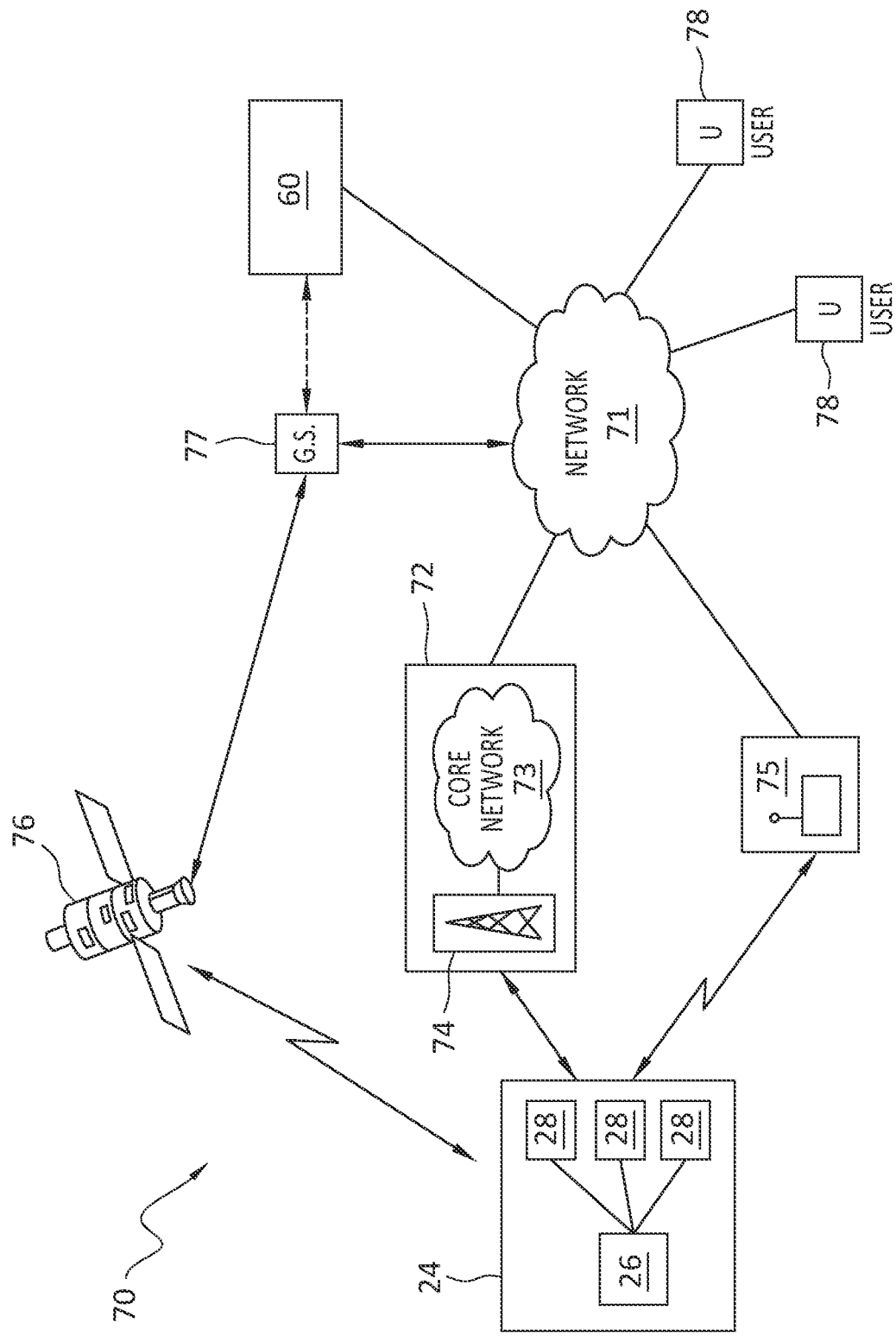
Figure 9:
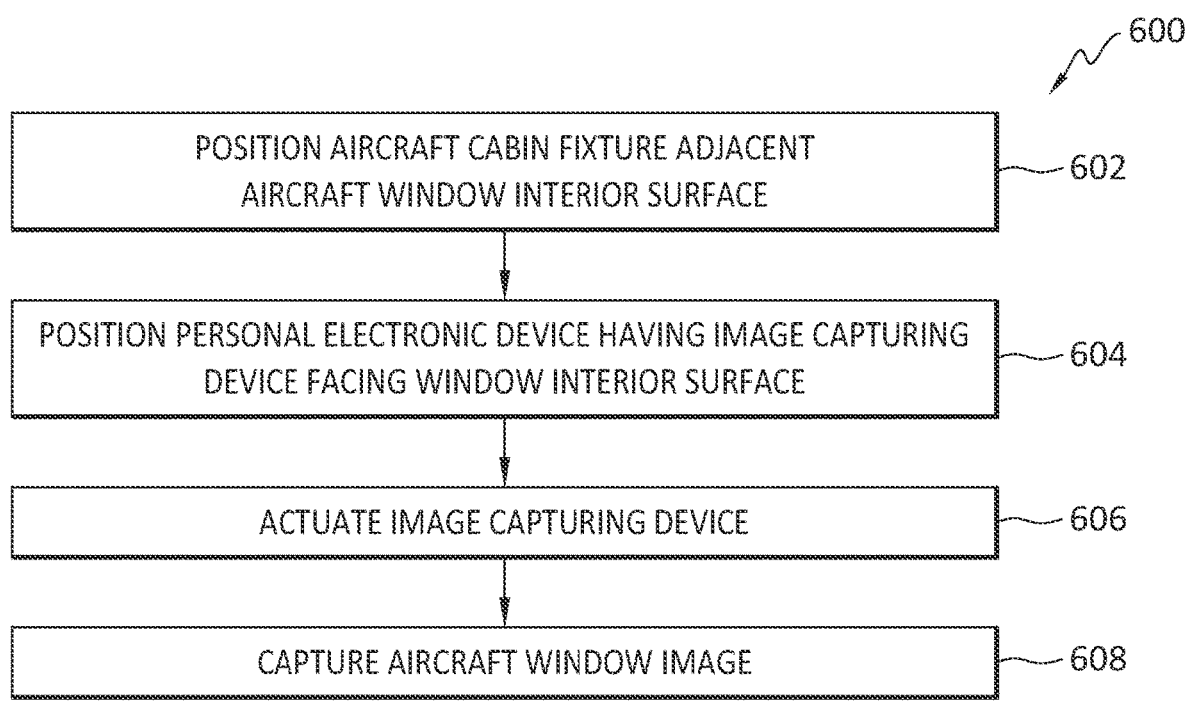
Figure 10:
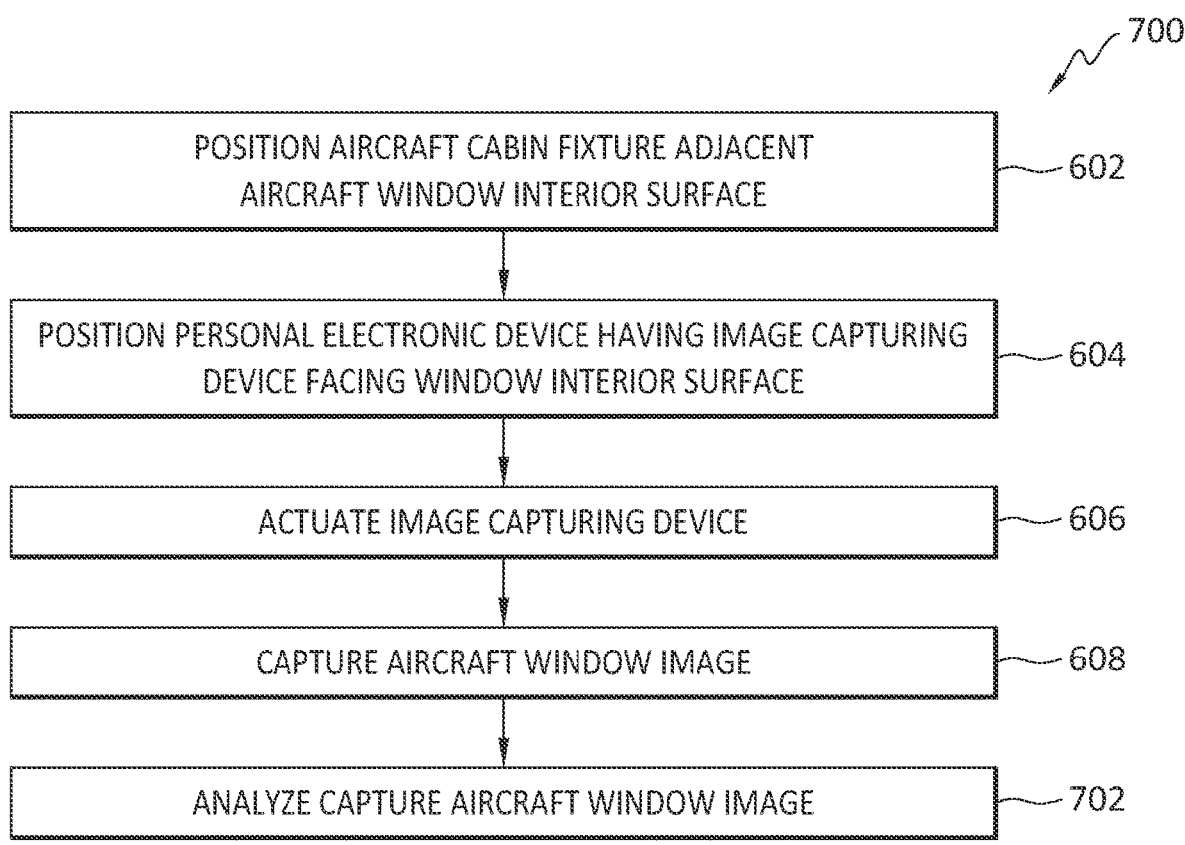
Figure 11:
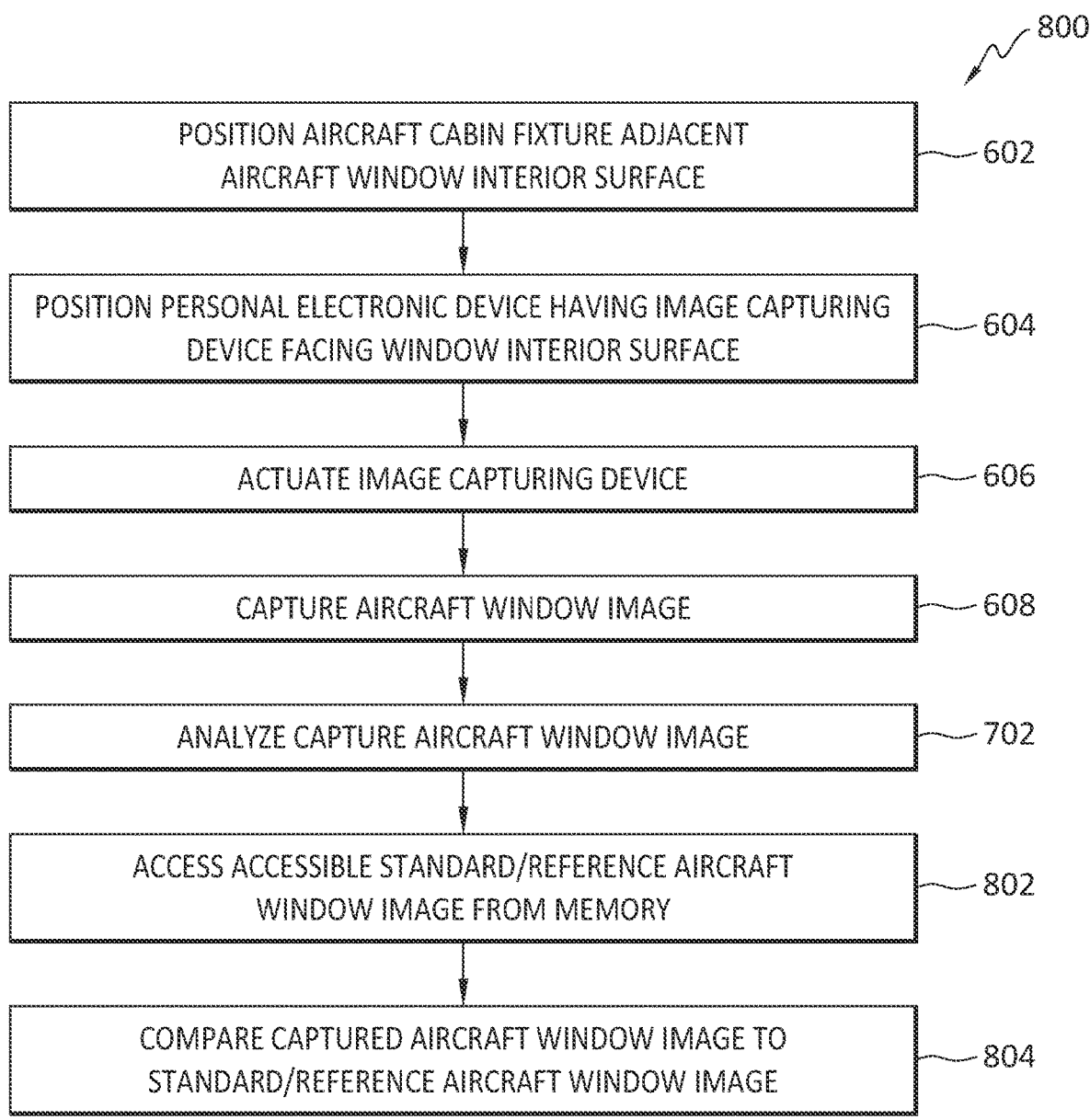
Figure 12:
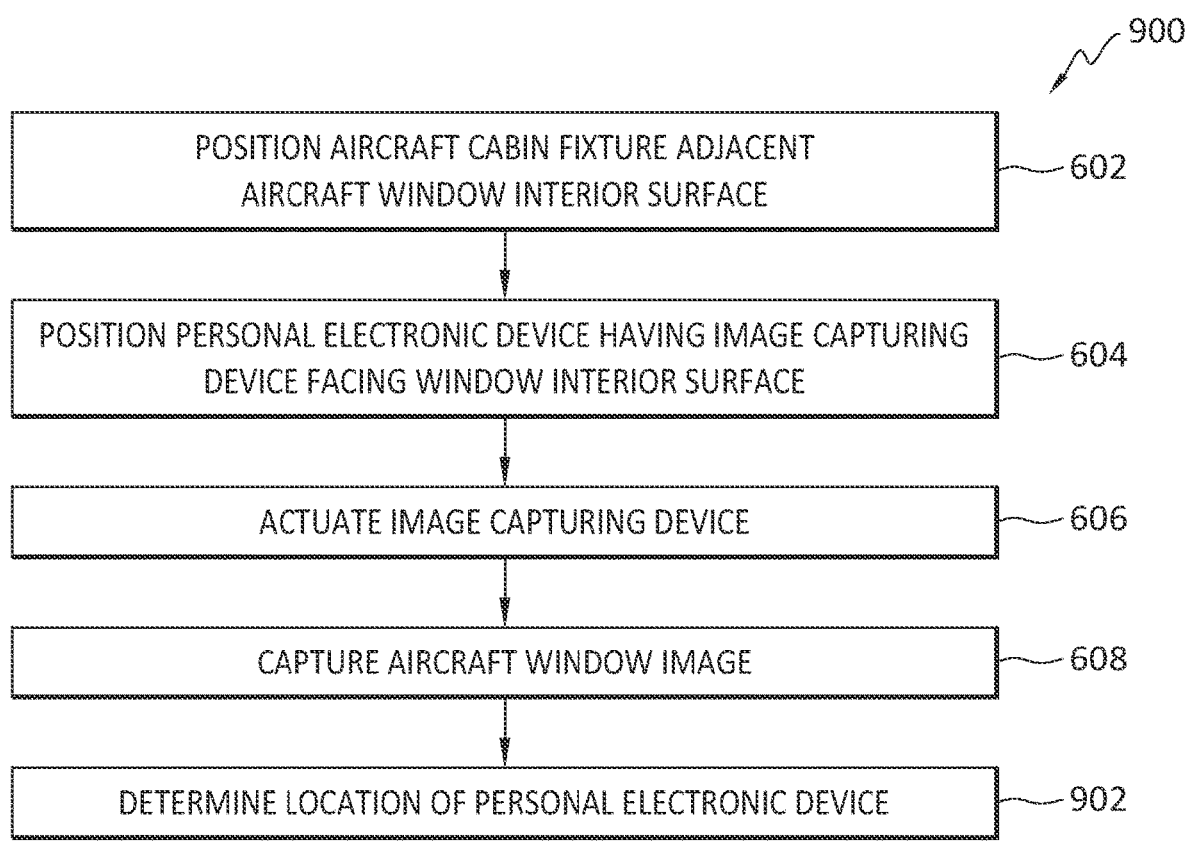
Figure 13:
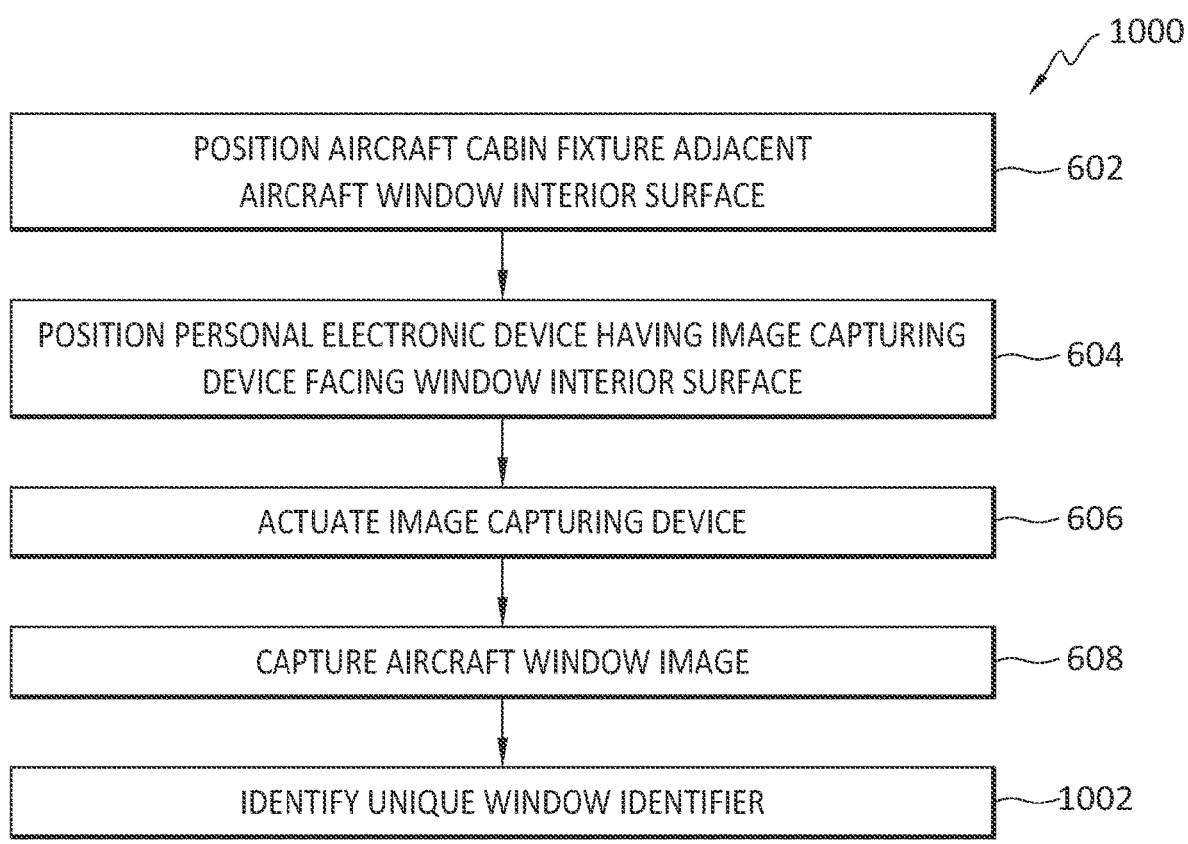
Figure 14:
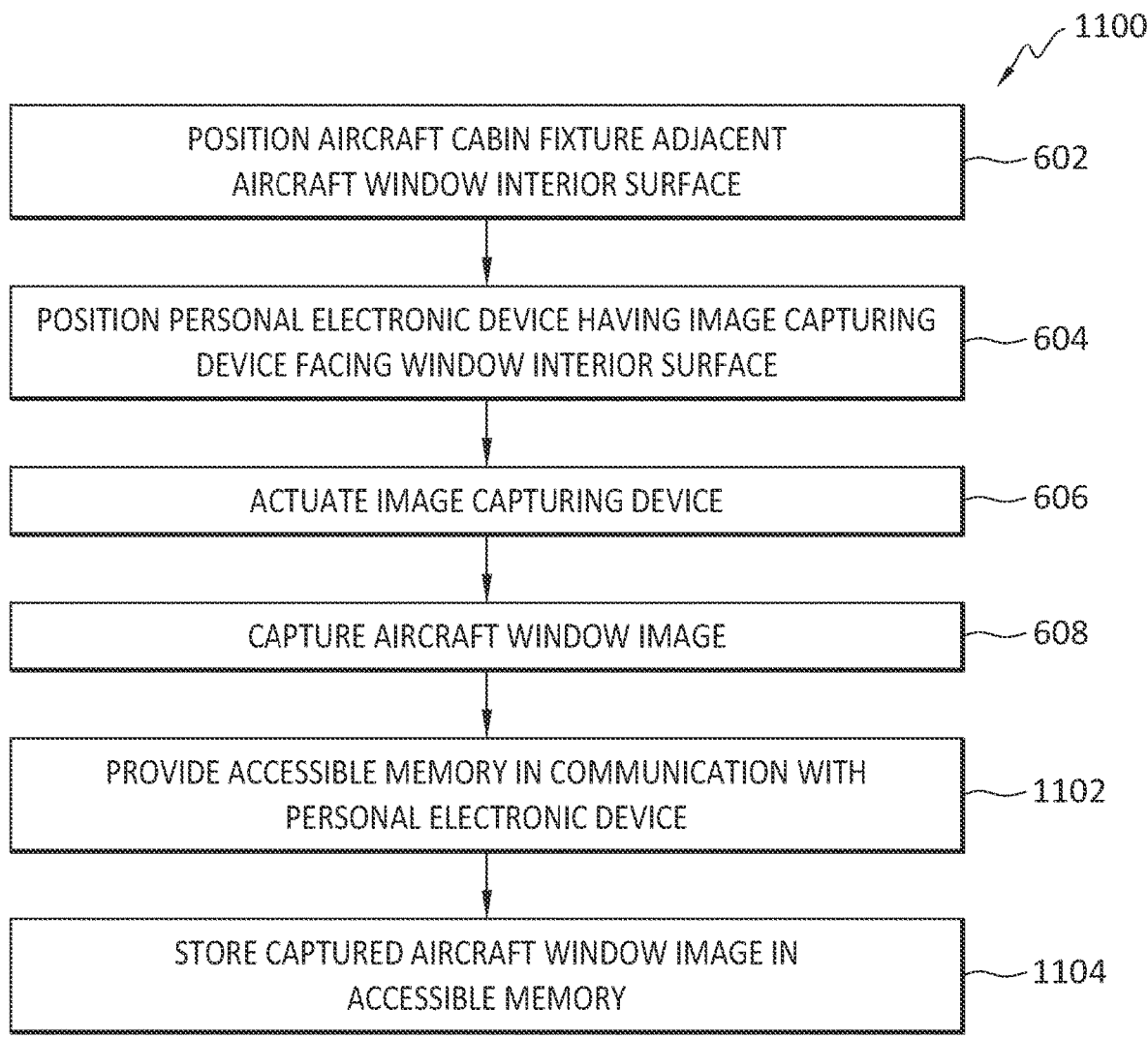
Figure 15:
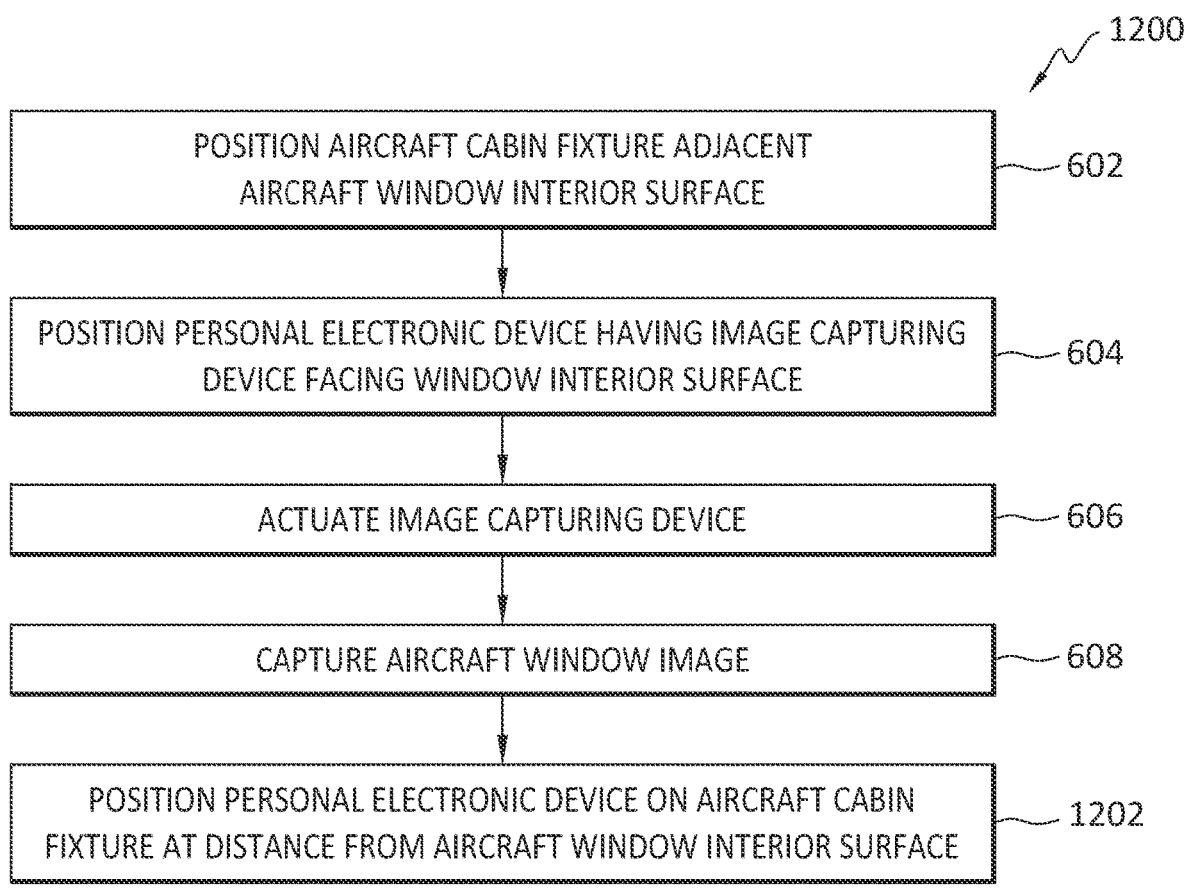
Figure 16:
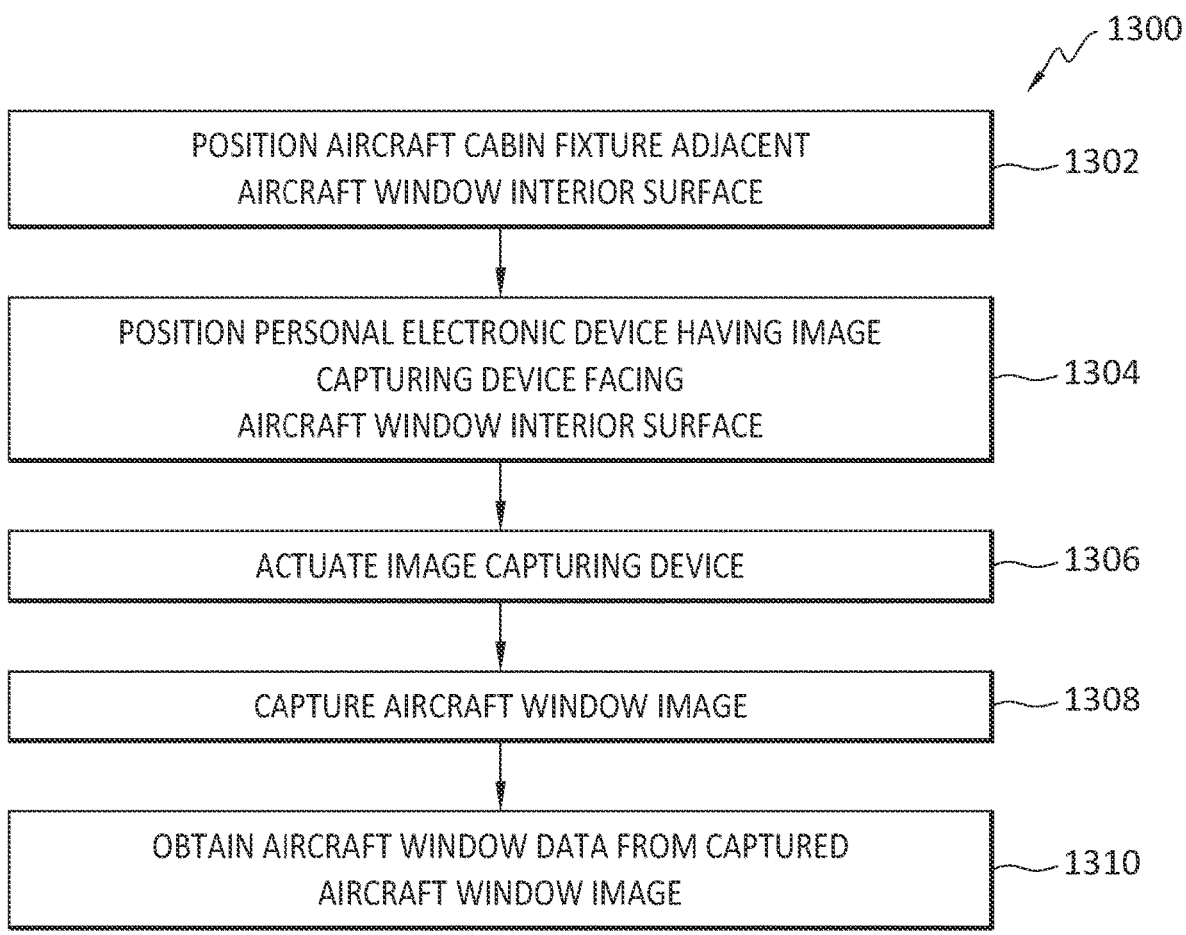
Figure 17:
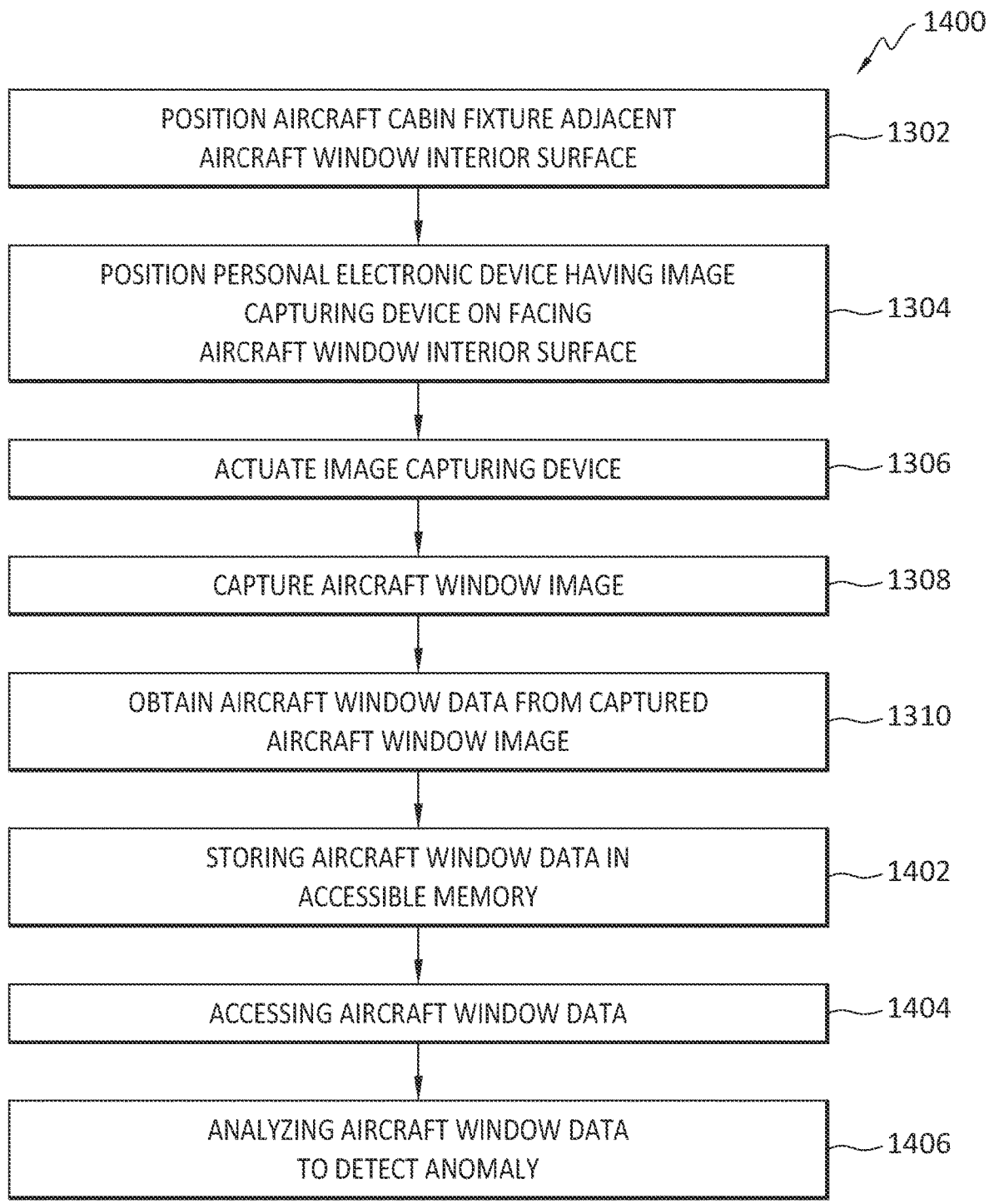
Figure 18:
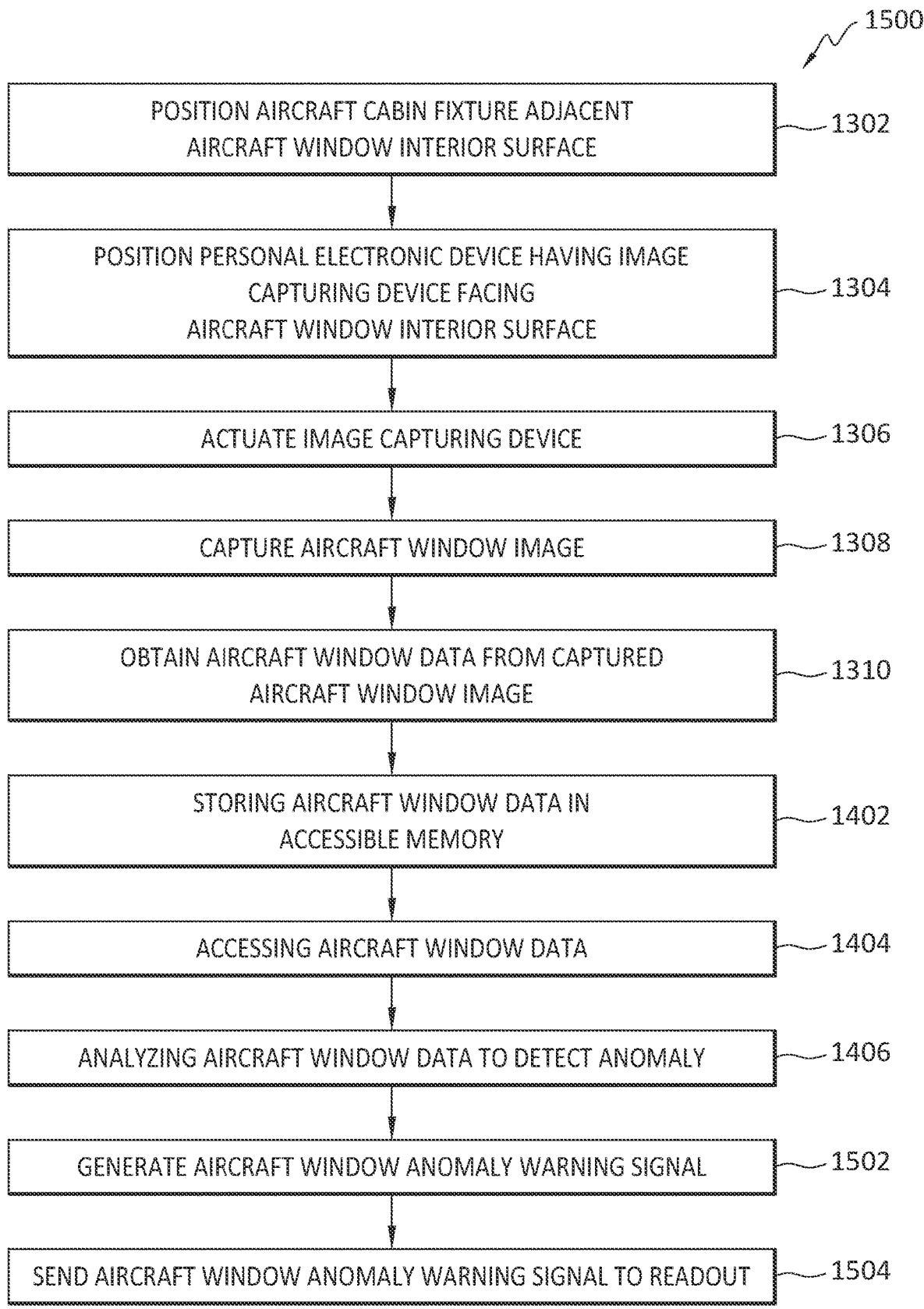
Figure 19:
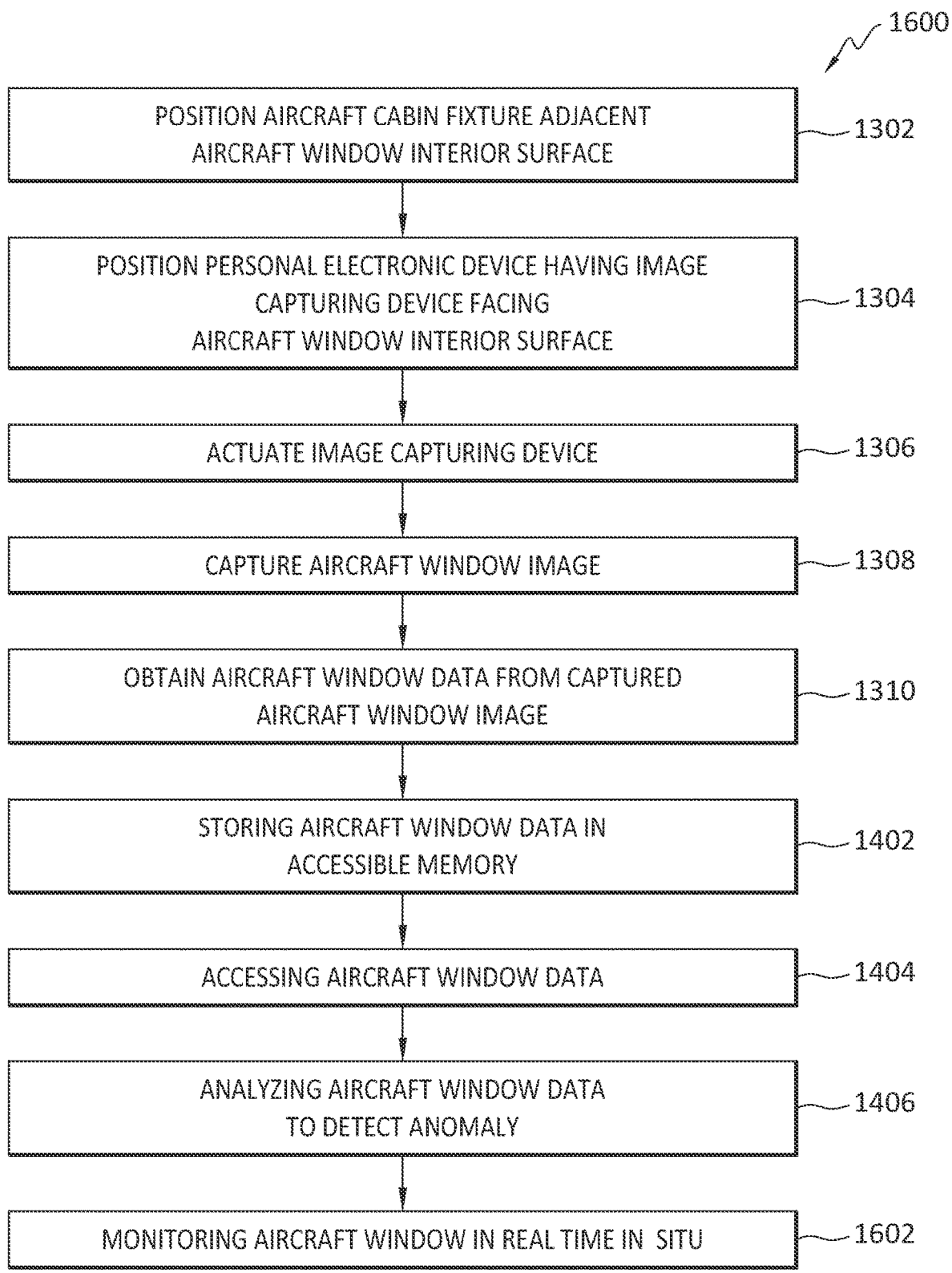

Having thus described variations of the disclosure in general terms, reference will now be made to the accompanying drawings, which are not necessarily drawn to scale, and wherein:

FIG. 1 is a perspective view of an aircraft, according to present aspects;

FIG. 2 is a cross-sectional view of an aircraft interior, including an aircraft cabin, according to present aspects;

FIG. 3 is a view of an aircraft cabin monument in a position within an aircraft cabin; according to present aspects;

FIG. 4A is a view of an aircraft cabin section showing an aircraft monument positioned adjacent an aircraft window, according to present aspects;

FIG. 4B is a view of an aircraft cabin section showing an aircraft monument positioned adjacent an aircraft window, according to present aspects;

FIG. 5 is a front view of a personal electronic device, according to present aspects;

FIG. 6 is a schematic diagram of a control unit, according to present aspects;

FIG. 7 is a schematic diagram of a server and analyzing subsystem, according to present aspects;

FIG. 8 is a schematic diagram of a wireless communications network, according to present aspects;

FIG. 9 is a flowchart outlining a method, according to present aspects;

FIG. 10 is a flowchart outlining a method, according to present aspects;

FIG. 11 is a flowchart outlining a method, according to present aspects;

FIG. 12 is a flowchart outlining a method, according to present aspects;

FIG. 13 is a flowchart outlining a method, according to present aspects;

FIG. 14 is a flowchart outlining a method, according to present aspects;

FIG. 15 is a flowchart outlining a method, according to present aspects;

FIG. 16 is a flowchart outlining a method, according to present aspects;

FIG. 17 is a flowchart outlining a method, according to present aspects;

FIG. 18 is a flowchart outlining a method, according to present aspects;

FIG. 19 is a flowchart outlining a method, according to present aspects; and

Figure 20:
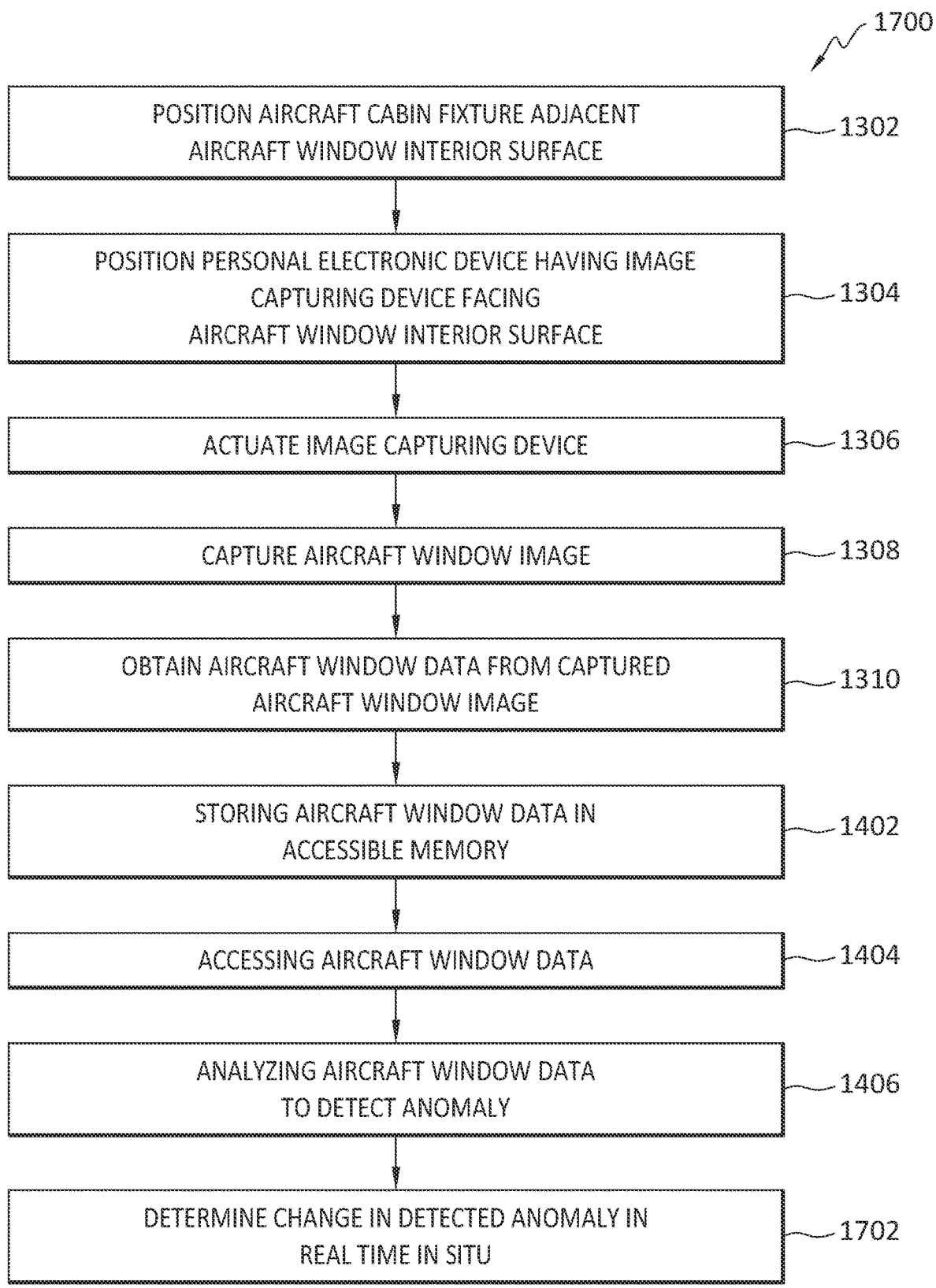

FIG. 20 is a flowchart outlining a method, according to present aspects.

DETAILED DESCRIPTION

Maintaining aircraft cabin window integrity and appearance and providing the largest number of passenger windows possible, without blockage, throughout a passenger aircraft cabin is important to the successful operation of an airline fleet, and can enhance customer experience. The total number of passenger aircraft cabin windows in an aircraft can be dictated by the design and structural requirements of an aircraft. In addition, various cabin configurations, including custom cabin configurations, can place seating, seating orientation, as well as other cabin fixture orientation, in the path of a passenger aircraft cabin window as viewed from an aircraft cabin interior.

If access to a significant amount of the total area of an aircraft cabin window is restricted, such that visual inspection of such aircraft cabin window (e.g., for the purpose of detecting and/or monitoring anomalies in the window, etc.) is rendered impossible or impractical, safety regulations can force such a restricted access window to be removed from service by "plugging" the window with an opaque structural component. In addition, such "plugging" of windows can become necessary due to the internal orientation of ducts occurring between the cabin interior and a fuselage skin, for example.

Aircraft design has typically restricted the structural need to plug a window such that very few windows (e.g., less than 3, 4, or 5, etc. windows) are taken "out of useful service" due to the need to plug a window because of the presence of structures between the cabin interior wall and the aircraft fuselage skin that must occur at the location of a window, and that otherwise "block" a window. Obviously, a plugged window does not allow a passenger to look through the window due to the presence of the opaque "plug". In addition, the plugging of windows can restrict or reduce the total amount of light that is permitted to enter a passenger aircraft cabin interior via the windows. Further, the overall ambiance, or aesthetics of an aircraft cabin interior (including, for example, First Class and Business Class aircraft cabins, etc.) can be significantly impacted by an undesired loss of view through operable, clear windows.

If an aircraft cabin window cannot be visually inspected, as typically required by prescribed regulations, "plugging" of such an aircraft window that, for example, cannot be visually inspected, is deemed necessary by regulation The present apparatuses, systems, and methods, facilitate and enable, for the first time, a complete visual inspection in situ and a complete visual monitoring of encumbered aircraft window interior surfaces that are at least partially blocked by aircraft cabin fixture placement (e.g., blocked due to a desired cabin design resulting in, for example, aircraft cabin fixture placement adjacent one or more windows, etc.), that previously could not be visually inspected, and that previously could have required window "plugging" due to an inability to directly and visually access the interior window surface for visual inspection in the course of, for example, regular window maintenance, and/or window inspection, as regulatorily required.

For present purposes, an anomaly in an aircraft cabin window pane can be an inclusion, nick, scratch, or other deformation or occurrence that can be cosmetic and/or that can produce stress in at least a portion of or an area of an aircraft cabin window surrounding the anomaly, including aircraft cabin windows (e.g., aircraft window pane(s)) made from transparent materials that can include, for example, glass, acrylic, polycarbonate, or other transparent material. A window pane within an aircraft window assembly can be considered as a three-dimensional structure with a surface of the pane (e.g., an interior surface, an exterior surface, etc.) defining the X and Y axes and the thickness of the pane representing the Z axis. An anomaly in the window pane can produce stress, deformation, and/or elongation in the X and Y directions in the window pane. A difference in stress in the X and Y directions at a minimum can affect the length of the optical path through the window pane in the Z direction.

FIG. 1 is an illustration of an aircraft 10, according to present aspects, with aircraft 10 comprising fuselage 12 and a plurality of aircraft windows 14, with the aircraft windows comprising an aircraft window exterior surface 14a.

FIG. 2 is a cross-sectional view of aircraft 10 taken along line A-A. As shown in FIG. 2, aircraft 10 comprises fuselage 12 defining an aircraft interior, and aircraft cabin wall 15 defining an aircraft cabin 16. As further shown in FIG. 2, aircraft cabin fixture 18 is shown in FIG. 2 in the form of a bank of aircraft passenger seats 20 positioned within aircraft cabin 16. An aircraft passenger seat 20a that can be of the type of aircraft passenger seat 20 that is positioned adjacent or in close proximity to an aircraft cabin wall 15, is further shown in FIG. 2.

FIG. 3 is an enlarged partial view of a section of aircraft cabin 16 showing a section of aircraft cabin wall 15 including, and at the location of, an aircraft window 14, with the aircraft window 14 including an aircraft window interior surface 14b and an aircraft window exterior surface 14a. FIG. 3 further shows an aircraft cabin fixture 22 in the form of an aircraft cabin monument positioned adjacent the aircraft window 14.

For purposes of the present application, the term "adjacent" with respect to the placement of the aircraft cabin fixture with respect to the aircraft window interior surface means "in close proximity to", but "adjacent" does not mean "immediately adjacent to", or "in actual contact with" an aircraft window or an aircraft cabin wall. Present aspects recognize and observe the existence of a necessary gap or "space" (e.g., an inspection space") existing between the aircraft cabin fixture and the aircraft window interior surface when the aircraft cabin fixture is placed "adjacent to" or in "close proximity to" the aircraft window interior surface.

As further shown in FIG. 3, aircraft cabin fixture 22 comprises an aircraft cabin monument vertical wall 22a and aircraft cabin monument horizontal wall 22b, with aircraft cabin monument vertical wall 22a and/or potentially the aircraft monument horizontal wall 22b at least partially obscuring and otherwise blocking a portion (that can be, for example, a significant portion, such as a majority of the area) of aircraft window 14. Such an aircraft monument configuration positioned adjacent an aircraft window could increase the difficulty of obtaining visual access to the entirety of aircraft window 14 (e.g., as may be regulatorily required, for example, for the purpose of maintaining an "unplugged" window, etc.). As shown in FIG. 3, the inaccessible portion of the aircraft window 14 is identified in FIG. 3 as aircraft window interior surface 14c (the portion that is not visible to visual inspection, accessible for direct visual inspection, and/or that is otherwise "blocked" by aircraft cabin monument 22).

The varied types of aircraft monument placement adjacent windows can be responsive, for example, to customer demand for higher monument walls or "suites" comprising higher walls (e.g., for privacy in upgraded seating classes, etc.), and that can include first class and business class cabins with larger seats and more rigid surrounding structures that can include higher monument vertical walls and higher horizontal monument walls, etc. As described herein, present aspects allow for and otherwise facilitate the in situ inspection of aircraft windows that could be at least partially "blocked" by aircraft monument designs. Present aspects further facilitate allowing for and otherwise promoting significantly greater flexibility for aircraft cabin design and monument configuration within the aircraft cabin that may block, (or at least partially block) direct visual access to aircraft window interior surfaces (e.g., direct visual inspection by a human), from the routine inspection of such aircraft windows.

According to present aspects, FIG. 4A shows a partial and exposed view of components of the present systems and apparatuses positioned within an aircraft cabin, with the aircraft cabin including a section of aircraft cabin wall 15 and an aircraft cabin monument 22 positioned immediately adjacent aircraft cabin wall 15 at a location along the aircraft cabin wall 15 where an aircraft window 14 occurs, with the perimeter of aircraft window 14 bounded and otherwise defined by the aircraft cabin wall. An aircraft cabin monument 22 of the type, for example, shown in FIG. 3, that includes an aircraft cabin monument vertical wall 22a is shown in FIG. 4A positioned within an aircraft cabin and positioned adjacent to an aircraft window 14.

In an alternate aspect, aircraft monument 22 can be another type of aircraft cabin fixture 18 such as, for example, an aircraft passenger seat 20a that can be of the type of aircraft passenger seat 20 that is positioned adjacent or in close proximity to an aircraft cabin wall 15 (such as, for example, the type of aircraft passenger seat 20a, as shown in FIG. 2), a galley component, a lavatory component (e.g., a temporary or fixed position lavatory wall component), a storage compartment, etc., with the selected aircraft monument positioned adjacent at least a portion of an aircraft cabin window 14.

As further shown in FIG. 4A, and according to a present aspect, a personal electronic device 24 (that can be in the form of, for example, an electronic tablet, a cell phone, etc.), is attached, is integral with, or is otherwise in communication with the aircraft cabin monument 22 (and, as shown in FIG. 4A, with aircraft cabin monument vertical wall 22a), with aircraft cabin monument configured to receive personal electronic device 24.

As shown in FIG. 5, the personal electronic device 24 comprises a personal electronic device screen 25, with the personal electronic device screen comprising a majority of the front surface of the personal electronic device 24. FIG. 4A shows personal electronic device 24 positioned to face aircraft cabin window 14, with personal electronic device 24 spaced a close distance "d2" from the aircraft cabin window interior surface 14b (with aircraft cabin window interior surface including the portion of aircraft window interior surface 14c that can be at least partially "blocked" from viewing from a position within the aircraft cabin interior by aircraft monument 22 positioned adjacent, or in close proximity to the aircraft window).

According to present aspects, the aircraft cabin monument that can be positioned within the aircraft cabin and that can at least partially block a portion of an aircraft window can be, for example, an aircraft passenger seat 20a (e.g., of the type as shown in FIG. 2, etc.), a galley component, a lavatory component (e.g., a temporary lavatory wall or fixed position lavatory wall component), a storage compartment, etc. As shown in FIG. 4A, the distance between an aircraft window interior surface 14b and an aircraft cabin fixture 18 positioned adjacent or in close proximity to an aircraft window 14 can be a selected distance "d1" defining a small space (such small space referred to herein as the inspection space 29) between the aircraft cabin fixture 18 and the aircraft window, with d1 defining a distance that can range from about 0.5 inches to about 6 inches, and that can further range from about 0.5 inches to about 4 inches, that further can range from about 1 inch to about 4 inches, and that can still further range from about 1 inch to about 2 inches.

As shown in FIG. 4A, the very small distance "d1" between the aircraft fixture positioned adjacent or in close proximity to the aircraft window can be a distance that is regarded as too small to maneuver into (e.g., too small for an inspector to reliably gain a line of sight from an inspector's eye to the aircraft window under inspection, etc.). As discussed herein, the inability to reliably and physically inspect an aircraft window (including, for example, a regulatorily mandated window inspection, etc.) can result in an aircraft interior design alteration or the potential need to "plug" such a blocked or partially blocked aircraft window.

As further shown in FIG. 4A, the distance from the image capturing device 26 of the personal electronic device 24 is a selected distance d2 that, as shown in FIG. 4A, is less than the selected distance d1. Although not shown in FIG. 4A, present aspects further contemplate a personal electronic device being integral with the aircraft fixture 18, such that the personal electronic device can be, for example, "countersunk" or otherwise recessed into the aircraft fixture such that the front surface of the personal electronic device is "flush" or nearly "flush" with the surface of the aircraft fixture that faces the aircraft window. In such an orientation, present aspects contemplate that distance "d1" can be equal to or otherwise closely approximate distance "d2".

FIG. 4B shows present apparatuses, systems, and methods contemplating arranging an aircraft cabin fixture 18 in close proximity to (e.g. adjacent to) and otherwise positioned a selected close distance "d1" from an aircraft window interior surface to form and otherwise define an inspection space 29 located between the aircraft cabin fixture 18 and the aircraft window interior surface 14*a*. As shown in FIG. 4B, according to an alternate present aspect, a personal electronic device 24' is not attached to, integral with, or otherwise in direct communication with aircraft fixture 18. Instead, as shown in FIG. 4B, personal electronic device 24' can be introduced manually or automatically (e.g., during an inspection, etc.) into the inspection space 29 created and that is otherwise formed and defined between the aircraft cabin fixture 18 and the aircraft window interior surface 14*a*. As shown in FIG. 4B, personal inspection device 24' is extended into inspection space 29 via a personal electronic device extender 27 that can be attached to, integral with, and/or otherwise in communication with the personal electronic device 24'. As further shown in FIG. 4B, the distance from the image capturing device 26 (e.g., the front surface of the personal electronic device 24' that faces the aircraft window 14) is positioned at a selected distance d2 from the aircraft window interior surface 14*b*, with distance d2 being a distance that is less than the selected distance d1.

According to a present aspect personal electronic device 24' (in communication with personal electronic device extender 27) comprises an image capturing device 26 that can be inserted by an inspector into the inspection space 29 (for example, an inspector that can be e.g., a human inspector, a robotic inspector, etc.) for the purpose of capturing an image of the aircraft window during a periodic or otherwise scheduled inspection of an aircraft window, with such inspected aircraft window being difficult to access, and/or that can be at partially inaccessible to ordinary visual inspection from within the cabin.

As shown in FIG. 5, a personal electronic device 24 (or 24') of the type as shown, for example, in FIGS. 4A and 4B, can be a cell phone having dimensions commensurate with accepted cell phone dimensions. The personal electronic device 24, 24' includes an image capturing device 26 that can be, for example, a camera function, and a personal electronic device screen 25. As shown in FIG. 5, the personal electronic device 24 has been activated (e.g., configured into an operable image capturing state, etc.) as evidenced by the image of a facing aircraft window as the captured image 28 on the personal electronic device screen 25, with the captured image 28 of the aircraft window in focus and centered within the personal electronic device screen 25. In the event aircraft window 14 included an anomaly within the aircraft window, an image of such anomaly present in an aircraft window inspected according to present methods, systems, and apparatuses would be recorded as the anomaly image 30 in the captured image 28 of the aircraft window, for example, the aircraft window 14 undergoing an inspection and analysis.

While personal electronic device 24, 24' has been described herein as being, for example, a cell phone, or an electronic tablet, etc., present aspects contemplate the incorporation of any readily and commonly available and accessible personal electronic device capable of being configured and operated to capture an image (e.g., a photographic image, etc.) of suitable quality and of suitable magnification to yield a useful image to facilitate analysis and inspection of the target being imaged in the form of an aircraft window to be inspected and analyzed in situ and in real time during an inspection and analysis, etc. According to present aspects, the personal electronic device can be configured to activate the image capturing device via direct activation (e.g., by a human inspecting a target window for anomalies, etc.) and/or the personal electronic device can be configured to activate the image capturing device activated remotely.

The image(s) captured by the image capturing device of the personal electronic device can be "still shot(s)", or can be a video, and the captured image(s) can further be captured and then relayed for visual or computer (e.g., artificial intelligence inspection, such as, for example, via computer, etc.) and/or stored in a memory in real time. Further, according to present aspects, the personal electronic device 24 can remain activated for the purpose of providing a continuous "feed" of continuously captured images. "Real time", as used in the present disclosure, refers to a very short period of time that can be period of time less than one second in duration, or that can be a period of time ranging between about 0.1 second and about 1 second in duration.

According to further present aspects, presently disclosed apparatuses, systems, and methods contemplate inspecting in situ an aircraft window installed on an aircraft including perceiving and otherwise identifying a unique window identifier corresponding to a specific aircraft cabin window that can further identify a unique or particular aircraft cabin window location within a specific aircraft, specific aircraft location, specific aircraft location within a specific aircraft, etc. The unique window identifier (referred to equivalently herein as a unique "part" identifier; a unique "window part" identifier; a unique "window assembly" identifier; and/or a unique "window assembly part" identifier, "window pane" identifier, etc.) can be, for example, a visually readable part code (e.g. a numeric code or number, a letter-based code, an alphanumeric code, a symbol based code, etc.) that can be perceived and otherwise visually "read" in an image captured (e.g., "taken") by the image capturing device of the personal electronic device.

According to present aspects, recognition of a unique part identifier by the present image capturing devices in combination with the analyzing subsystem can provide a way to catalog or otherwise organize a location-based inspection regimen. According to present aspects, if an aircraft window pane, for example, possessed a serialized number or code, the precise "batch" of manufactured window panes could be identified in order to anticipate the development of similar anomalies developing on other window panes manufactured in the same "batch", for example. Assuming that serialized window pane numbers are entered into an accessible databank and/or accessible memory, etc., (e.g., during aircraft manufacture, etc.), according to present aspects, reading such serialized numbers by the present apparatuses, systems, and methods could further determine what aircraft is being inspected, as well as determine the precise location of an inspected window pane on a particular aircraft.

According to present aspects, in view of the relatively small distance "d2" from an aircraft window surface to the front of the personal electronic device configured to face the aircraft cabin window, present aspects contemplate the personal electronic device image capturing device comprising a lens capable of capturing a useful image of the target aircraft cabin window even when the aircraft cabin window exists at a small selected distance "d2" from the personal electronic device, such that the selected distance d2 therebetween ranges from about range from about 0.5 inches to about 6 inches, and that can further range from about 0.5 inches to about 4 inches, that further can range from about 1 inch to about 4 inches, and that can still further range from about 1 inch to about 2 inches.

Accordingly, due to the relatively small value of distances "d1" and/or "d2", present aspects contemplate the incorporation into the image capturing device 28 of the personal electronic device 24 of a wide angle lens, with such lens having a focal length capable of recording an image within a field of view (FoV) ranging from about 64° (degrees) to about 84° (degrees) in the case of a wide-angle lens, and an ultra-wide angle lens (e.g., a lens having a shorter focal length than the wide angle lens) capable of recording an image within a field of view (FoV) ranging about 84° to about 114°. In a further aspect, the focal length of the image capturing device associated with a selected personal electronic device comprises at least one lens or a plurality lens that in combination comprises a totality of focal lengths capable of capturing an image within a field of view ranging from about 64° up to about 120°.

Examples of present aspects set forth herein of in situ and real time aircraft window inspection methods, apparatuses, and systems can include the inspection and analysis of a single window "pane" in an aircraft window assembly, and/or the inspection and analysis of an aircraft window assembly that can comprise more than one window "pane". Accordingly, the present disclosure further contemplates presently disclosed inspection and analysis methods, apparatuses, and systems where more than one window "pane" can be inspected and analyzed within an aircraft window assembly that can contain more than one window pane (e.g., an inner window pane and an outer window pane, etc.).

Aspects of the present disclosure also provide a system for inspecting in situ and in real time an aircraft window (e.g., an aircraft cabin window, and portions of an aircraft cabin window within an aircraft window assembly, etc.) that is at least partially blocked from direct and complete viewing from within an aircraft cabin (e.g., by human visual inspection, etc.), with the aircraft window defining an aircraft window exterior surface and an aircraft window interior surface an aircraft, and wherein an aircraft window assembly can comprise a plurality of aircraft windows (e.g., an inner or interior window pane and an outer or exterior window pane, etc.).

Present apparatuses, systems, and methods comprise the use of a personal electronic device that is configured to attach to, is integral with, or is otherwise in communication with and positioned adjacent to an aircraft cabin fixture that is positioned proximate to, and otherwise in close proximity to, an aircraft cabin window that is at least partially blocked from full and direct view from the aircraft cabin. At least a portion of the aircraft cabin fixture is configured to block at least a portion of an aircraft cabin window, such that at least a portion of an aircraft cabin window cannot be accessed for directly viewing the entirety of the aircraft cabin window from within the aircraft cabin. That is, at least a portion of an aircraft cabin fixture "blocks" direct visual access to at least a portion of the aircraft cabin window such that the aircraft cabin window cannot be accessed for inspection by human visual inspection.

According to present systems, the personal electronic device comprises an image capturing device, with the image capturing device configured to face the aircraft cabin window. The personal electronic device can be positioned at (integral with or attached to, or otherwise in communication with) the aircraft cabin fixture at a distance from the aircraft cabin window ranging from about from about range from about 0.5 inches to about 6 inches, further ranging from about 0.5 inches to about 4 inches, and further ranging from about 1 inch to about 4 inches, and still further ranging from about 1 inch to about 2 inches. The focal length of the image capturing device associated with a selected personal electronic device comprises at least one lens or a plurality lense that in combination comprises a totality of focal lengths capable of capturing an image within a field of view ranging from about 64° up to about 120°.

Presently disclosed systems further comprise the personal electronic device configured to be in communication with an analyzing system that can analyze images captured by the image capturing device of the personal electronic device. According to present systems, the personal electronic device 24, 24', can include and otherwise be in communication with a control unit 50 as illustrated in FIG. 6. According to a present aspect, the control unit 50 includes a control circuit 51 and a memory circuit 52. The control circuit 51 can control overall operation of the personal electronic device 24, 24' according to program instructions stored in the memory circuit 52. The control circuit 51 can include one or more circuits, microcontrollers, microprocessors, hardware, or a combination thereof. Memory circuit 52 can include a non-transitory computer readable storage medium storing program instructions, such as a computer program product, that configures the control circuit 51 to implement one or more of the techniques discussed herein. Memory circuit 52 can include various memory devices such as, for example, read-only memory, and flash memory. Memory circuit 52 can be a separate component as illustrated in FIG. 6, or can be incorporated with the control circuit 51. Alternatively, the control circuit 51 can omit the memory circuit 52, e.g., according to at least some present aspects in which the control circuit 51 is dedicated and non-programmable.

The control unit 50 can be configured to provide for communication functionality for the personal electronic device 24, 24' and for the image capturing device 26 in the personal electronic device 24, 24'. Communications can include both incoming and outgoing communications. A communications circuit 53 provides for this communication functionality. The communications circuit 53 can enable communication between the personal electronic device 24, 24' and, for example, remote entities over a communication network.

The communications circuit 53 can include one or more interfaces that provide for different methods of communication. The communications circuit 53 can include a cellular interface that enables communication with a mobile communication network (e.g., a WCDMA, LTE, or WiMAX network). The communication circuit 53 can include a WLAN interface configured to communicate with a local area network, e.g., via a wireless access point. An exemplary WLAN interface could operate according to the 802.11 family of standards, which is commonly known as a WiFi interface. The communication circuit 53 can further include a personal area network interface, such as a Bluetooth interface. The communication circuit 53 can also include a Near Field Communication interface that provides for short-range wireless connectivity technology that uses magnetic field induction to permit devices to share information with each other over short distances.

In one example, and as illustrated in FIG. 6, the communications circuit 53 is incorporated into the control unit 50. In another example, the communications circuit 53 is a separate system that is operatively connected to and controlled by the control unit 50. A power source 54 provides power to the control unit 50. The power source 54 can include various configurations, including but not limited to batteries. The power source 54 can include a connector 56 to provide a hardwire connection to an external power source (e.g., electrical power from the aircraft 10, etc.). FIG. 6 includes the power source 54 incorporated with the control unit 50. In another example, the power source 54 can be separate from the control unit 50 and configured to provide power to the control unit 50.

As illustrated in FIGS. 7, an analyzing subsystem 65 can comprise a server 60, that can be a remote server, can monitor the personal electronic device 24, 24', for example, at rest, or during operation of the aircraft. The remote server 60 can monitor and communicate with the personal electronic device, for example, through a wireless communications network 70 (as shown in FIG. 8). The communications circuit 53 (shown in FIG. 6) of the personal electronic device 24, 24' enables communication with the server 60 through the wireless communications network 70.

As shown in FIG. 8, the wireless communication network 70 can includes s packet data network (PDN) 71. The PDN 71 can include a public network such as the Internet, or a private network. The wireless communications network 70 can include a mobile communication network 72 (e.g., a WCDMA, LTE, or WiMAX network). The mobile communication network (MCN) 72 includes a core network 73 and a radio access network (RAN) 74 including one or more base stations. The MCN 72 can be a conventional cellular network operating according to any communication standards now known or later developed. For example, the MCN 72 can comprise a Wideband Code Division Multiple Access (WCDMA) network, a Long Term Evolution (LTE) network, or WiMAX network. The MCN 72 is further configured to access the packet data network (PDN) 71.

The communications circuit 53 can also communicate through a Wireless Local Area Network (WLAN) 75 that operates according to the 802.11 family of standards, which is commonly known as a WiFi interface. Communications can also be available through one or more satellites 76. The satellites 76 can communicate to the server 60 through one or more of ground stations 77. The ground stations 77 can communicate to the server 60 through the PDN 71, or without use of the PDN 71.

As illustrated in FIG. 7, the server 60 can include one or more processing circuits (illustrated as processing circuit 61 that may include one or more microprocessors, microcontrollers, Application Specific Integrated Circuits (ASICs), or the like, configured with appropriate software and/or firmware. A computer readable storage medium (shown as memory circuit 62) stores data and computer readable program code that configures the processing circuit 61 to implement the techniques described above. Memory circuit 62 is a non-transitory computer readable medium, and may include various memory devices such as random access memory, read-only memory, and flash memory. A communications circuit 63 connects the server 60 to the PDN 71, and can be configured to communicate with the PDN 71 according to one or more 802.11 standards. The communications circuit 63 can support a wired connection (e.g., Ethernet), a wireless connection, or both. A database 64 stores information about aircraft windows under present and/or previous inspection in the form of, for example, captured images, portions of captured images (that may be enlarged, etc.) of aircraft windows; said captured images captured by the image capturing device of the personal electronic device 24, 24'. The database 64 is stored in a non-transitory computer readable storage medium (e.g., an electronic, magnetic, optical, electromagnetic, or semiconductor system-based storage device). The database 64 can be local or remote relative to the server 60. Taken together, the elements shown in FIG. 7 can comprise an analyzing subsystem 65 configured to analyze images captured by the personal electronic device, with the captured images relayed to the elements of the analyzing subsystem for analysis and reporting.

The analyzing subsystem 65 can be configured to provide a web interface for access by one or more entities. The server 60 is configured for accessing information about the personal electronic device using a browser-based interface or an applications program interface (API). The browser-based interface can include a website through which the contents of the database 64 can be accessible. Although the website can be hosted by the server 60, it can also be hosted at another location accessible through the PDN 71.

Entities can access the information at the server 60 through a variety of devices 78. The devices 78 can include laptop computers, personal computers, personal digital assistants, mobile computing/communication, tablet devices, and various other-like computing devices. Each of the entities uses a respective device 78 and accesses the server 60 through the PDN 71, or alternatively some other network. In one aspect, one or more of the entities can use his or her respective device 78 to access the server 60 through a separate portal. Each entity's portal can include a secure interface through which the entity can access the information that is assigned to them.

A variety of different entities through their devices 78 can have access to some or all of the information at the server 60. The entities can include inspectors in the form of human inspectors, and machine driven artificial intelligence performing the role of window inspection and image analysis, etc.

The server 60 can also access one or more information sources through the PDN 71. In one example, the server 60 is configured for browser-based accessibility. The browser-based interface can support well-known browsers such as Internet Explorer and Mozilla Firefox, Safari, Chrome. Alternatively, or in conjunction the entities can obtain the information using one or more APIs through their device 78.

Prior to inspection of an aircraft window in situ by the present apparatuses, systems, and according to present methods, information about the aircraft window can be entered and maintained at the database stored at the server 60 of an analyzing subsystem 65. The information can include but is not limited to a standard image (referred to equivalently herein as a "reference" image) of an aircraft window such as, for example, an aircraft window not containing an anomaly.

During an aircraft window inspection (for example, aircraft window inspections conducted according to present aspect with the window remaining in situ in an installed position within the aircraft, etc.), a record in the form of a captured image of an aircraft window can be compiled and stored in the database 64. Subsequent inspections can be compiled and stored in the database 64; for example, to monitor an inspected and analyzed aircraft window's condition progression in situ (e.g., the "spreading" or enlarging of an anomaly, the increase in numbers of anomalies, etc.), for example, over a selected time period.

FIGS. 9-20 are flowcharts outlining methods according to present aspects, and the methods outlined in FIGS. 9-20 can incorporate the apparatuses and systems described herein including the apparatuses and systems shown in FIG. 1, 2, 3, 4A, 4B, 5, 6, 7 and or 8.

For example, FIG. 9 is a flowchart outlining a method for inspecting in situ an aircraft window installed on an aircraft, with the aircraft defining an aircraft interior and an aircraft exterior, and with the aircraft window defining an aircraft window interior surface and an aircraft window exterior surface. As shown in FIG. 9, method 600 includes positioning 602 an aircraft cabin fixture within an aircraft cabin, with the aircraft cabin positioned within an aircraft cabin interior, at least a portion of the aircraft cabin fixture positioned adjacent an aircraft window interior surface. Method 600 further includes positioning 604 a personal electronic device having the image capturing device to face a window interior surface into an inspection space defined by the aircraft fixture and the aircraft window interior surface. Method 600 further includes activating 606 the image capturing device, with said image capturing device configured to comprise a range of field, said range of field ranging from about 64 degrees to about 120 degrees as measured from the image capturing device to the aircraft window interior surface, and capturing 608 an image of the aircraft window to form a captured image of the aircraft window. Method 600 further can include the aircraft cabin fixture comprising a personal electronic device, and with the personal electronic device comprising an image capturing device.

According to further present aspects, FIG. 10 outlines a method 700 for inspecting in situ an aircraft window installed on an aircraft according to a method including method 600 (as outlined in FIG. 9) and additionally including analyzing 702 the captured image of the aircraft window to detect the presence or absence of an anomaly in the aircraft window.

According to further present aspects, FIG. 11 outlines a method 800 for inspecting in situ an aircraft window installed on an aircraft according to method 700 (as outlined in FIG. 10) and additionally including accessing 802 an accessible standard aircraft window image from an accessible memory and comparing 804 the captured image of the aircraft window to the accessible standard aircraft window image (also referred to herein as an accessible "reference" aircraft window image).

According to further present aspects, FIG. 12 outlines a method 900 for inspecting in situ an aircraft window installed on an aircraft including method 600 (as outlined in FIG. 9) and additionally including determining 902 the location of the personal electronic device, at least relative to an aircraft window being inspected within an aircraft cabin.

According to further present aspects, FIG. 13 outlines a method 1000 for inspecting in situ an aircraft window installed on an aircraft including method 600 (as outlined in FIG. 9) and additionally including identifying (1002) a unique window identifier corresponding to a particular aircraft cabin window. As explained herein, the unique window (referred to equivalently herein as a unique "part" identifier; a unique "window part" identifier; a unique "window assembly" identifier; and/or a unique "window assembly part" identifier, and a unique "window pane" identifier can be, for example, a visually readable part code (e.g. a numeric code or number, a letter-based code, an alphanumeric code, a symbol based code, etc.) that can be perceived and otherwise visually "read" in an image captured (e.g., "taken") by the image capturing device of the personal electronic device.

In alternate present aspects, the unique window identifier need not be visual, but can be perceived or otherwise detected by an electronic or mechanical "reader" such as, for example, an RFID "reader" that is configured to detect an RFID "chip" or other device embedded within or affixed to an aircraft window assembly part or an aircraft window itself. According to present aspects, the RFID "reader" can be integrated into the personal electronic device, or can be a discrete device in communication that can be in communication with the personal electronic device and that can be further in communication with the analyzing subsystem and further in communication with the memory circuit.

According to further present aspects, the unique aircraft window identifier associated with a particular aircraft window allows present apparatuses, systems, and methods can "track" a particular and individual window in situ during and over the entirety of the duration of the useful life of the aircraft window, and/or during and over the entirety of the useful life of the aircraft. For example, the detection of a unique window identifier, according to present aspects, can trigger the retrieval of an image of an aircraft window associated with the unique window identifier, such that, in an inspection of the current state of the aircraft window under investigation, the retrieved image of the window under investigation can be compared to the window in its originally installed state, and/or over a progression of time during the useful life of the aircraft window being inspected, etc. The presence and "reading" of the unique window identifier by the present apparatuses and systems can facilitate the useful storage of past, present, and future captured images of a particular window according to the unique window identifier, for example, in a memory, etc.

According to further present aspects, FIG. 14 outlines a method 1100 for inspecting in situ an aircraft window installed on an aircraft including method 600 (as outlined in FIG. 9) and additionally including providing (1102) an accessible memory, with the accessible memory in communication with the personal electronic device, and storing (1104) the captured image of the aircraft window within the accessible memory.

According to further present aspects, FIG. 15 outlines a method 1200 for inspecting in situ an aircraft window installed on an aircraft including method 600 (as outlined in FIG. 9) and additionally including positioning a personal electronic device on an aircraft cabin fixture at a distance from the aircraft window interior surface, with the distance from the aircraft window interior surface ranging from about 0.5 to about 6 inches, with the aircraft cabin fixture configured to accept and retain the personal electronic device in an operationally useful position (e.g., facing the aircraft window, etc.).

According to further present aspects, FIG. 16 outlines a method 1300 for harvesting aircraft window data from an aircraft window installed on an aircraft in situ, with the aircraft window defining an aircraft window interior surface and an aircraft window exterior surface, with the method 1300 including positioning (1302) an aircraft cabin fixture within an aircraft cabin, at least a portion of with the aircraft cabin fixture positioned adjacent an aircraft window interior surface of the aircraft window, and with the personal electronic device comprising an image capturing device. Method 1300 further includes positioning (1304) the personal electronic device and the image capturing device configured to face the aircraft window interior surface, activating (1306) the image capturing device, with the image capturing device configured to capture a range of field, and with the range of field ranging from about 64 to about 120 degrees as measured from the image capturing device to the aircraft window interior surface. Method 1300 further includes capturing (1308) an image of the aircraft window to form a captured image of the aircraft window, and obtaining (1310) aircraft window data from the captured image of the aircraft window, wherein said aircraft window data comprises aircraft window anomaly data; and wherein said aircraft window data is harvested from the aircraft window in situ.

FIG. 17 outlines a method 1400 that includes method 1300 (as outlined in FIG. 16), and further includes storing (1402) the aircraft window data obtained from the captured image of the aircraft window in an accessible memory, with the accessible memory in communication with the personal electronic device, accessing (1404) the aircraft window data obtained from the captured image of the aircraft window from the accessible memory, and analyzing (1406) the aircraft window data to detect an aircraft window.

FIG. 18 outlines a method 1500 that includes method 1400 (as outlined in FIG. 17), and further includes generating (1502) an aircraft window anomaly warning signal, with the aircraft window anomaly warning signal generated in response to detecting an anomaly in the aircraft window, and sending (1504) the aircraft window anomaly warning signal to a readout.

FIG. 19 outlines a method 1600 that includes method 1400 (as outlined in FIG. 17), and further includes monitoring in real time (1602) an aircraft window.

FIG. 20 outlines a method 1700 that includes method 1400 (as outlined in FIG. 17), and further includes determining in real time (1702) a change in a detected aircraft window anomaly.

The analyzing system (equivalently referred to herein as an "analysis subsystem" or "analyzing subsystem") can be in communication with the image capturing device of the personal electronic device. The analyzing subsystem referred to as outlined herein is for exemplary purposes only as describing ways to conduct the analysis of the captured images of the aircraft cabin windows under inspection and monitoring, etc.

The analyzing subsystem can be operable to receive and operable to analyze the captured images captured by the image capturing device of the personal electronic device to capture such captured images. The analyzing subsystem can use a database of information relating to aircraft cabin window including aircraft cabin window appearance that can include, for example, "anomaly-free" standard or reference states and images for comparison to aircraft cabin windows under inspection that may comprise one or more anomalies in the window.

Analyzing an aircraft cabin window image can include analyzing images of the window captured by a camera as an image capturing device (to, for example, capture a photographic image) housed within or otherwise associated within or otherwise in communication with a personal electronic device, and the camera can be, for example, a digital camera that includes, for example, at least one of a wide angle lens having a wide angle lens function and/or an ultra-wide angle lens having an ultra-wide angle lens function. Regardless of the technical or descriptive categorization of the lens as wide or ultra-wide, present aspects contemplate image capturing devices associated with the personal electronic device configured to capture an image within a selected field of view (FoV) ranging from about 64° up to about 120°.

Such a selected field of view will allow a useful image capture of an adjacently located aircraft cabin window that is a very short distance away from the location of the personal electronic device that can be located within an inspection space adjacent an aircraft window, and that can be associated with and otherwise in communication with (e.g., integral with, or attached to, or affixed to, etc.) an aircraft cabin fixture (e.g., a passenger seat or an aircraft cabin monument, etc.) and that is located a very short distance away from the window, with the image capturing device located at a selected distance that can range from about 0.5 inches to about 6 inches; a distance at which human visual inspection is difficult, unreliable, or impossible to achieve, and that otherwise can leave at least a portion of an aircraft cabin window not visible or accessible.

Present methods, systems, and apparatuses can include configuring an analyzing subsystem to analyze an image recorded by the image capturing device and the analyzing subsystem can include providing the captured and/or recorded image to a computer configured with software for locating, identifying the presence of, and/or otherwise perceiving the existence of one or more window anomalies in the aircraft cabin window under investigation by the present apparatuses and systems that can be used in accordance with the presently disclosed methods.

Present methods can include the use of systems, and apparatuses that can establish a selected aircraft cabin window condition threshold, and analyzing the aircraft cabin window, according to present aspects, can include comparing the captured image to the "ideal" threshold established as a "standard" or "reference" for the aircraft cabin window. Present methods can include establishing a selected nominal "score" for the window that represents a "passing" and/or a "failing" condition of the window due to detected levels of anomalies, or changes in detected anomalies over time. In addition, the analyzing subsystem can record and relay information regarding a perceived condition of a window undergoing inspection such that a window of concern can be placed onto a "watch list" with subsequent inspection scheduled automatically to monitor any progression (e.g., changes in condition, etc.) of detected anomalies found in the window by the present apparatuses and systems, and through implementing the presently disclosed methods.

The present aspects may, of course, be carried out in other ways than those specifically set forth herein without departing from essential characteristics of the present disclosure. The present aspects are to be considered in all respects as illustrative and not restrictive, and all changes coming within the meaning and equivalency range of the appended claims are intended to be embraced therein.

What is claimed is:

1. A method for inspecting an aircraft window installed on an aircraft, said aircraft defining an aircraft interior and an aircraft exterior, said aircraft window defining an aircraft window interior surface and an aircraft window exterior surface, the method comprising:
 positioning an aircraft cabin fixture within an aircraft cabin, said aircraft cabin positioned within an aircraft interior, at least a portion of said aircraft cabin fixture positioned adjacent to and a selected distance from an aircraft window interior surface;
 positioning a personal electronic device adjacent the aircraft cabin fixture, said personal electronic device comprising an image capturing device, said image capturing device configured to face the aircraft window interior surface;
 activating the image capturing device, said image capturing device configured to comprise a range of field, said range of field ranging from 64 degrees to 120 degrees as measured from the image capturing device to the aircraft window interior surface;

capturing an image of the aircraft window to form a captured image of the aircraft window;

obtaining aircraft window data from the captured image of the aircraft window;

wherein said aircraft window data comprises aircraft window anomaly data; and wherein said aircraft window data is harvested from the aircraft window in situ.

2. The method of claim 1, further comprising:
analyzing the captured image of the aircraft window to detect the presence of an anomaly in the aircraft window.

3. The method of claim 1, wherein activating the image capturing device comprises remotely activating the image capturing device.

4. The method of claim 1, wherein the image capturing device is in communication with an analyzing subsystem.

5. The method of claim 4, wherein said analyzing subsystem comprises an accessible memory, said accessible memory comprising an accessible standard aircraft window image.

6. The method of claim 5, further comprising:
accessing the accessible standard aircraft window image from the accessible memory; and
comparing the captured image of the aircraft window to the accessible standard aircraft window image.

7. The method of claim 1, wherein the personal electronic device is in communication with a locating subsystem, said method further comprising:
determining location of the personal electronic device within the aircraft interior.

8. The method of claim 1, wherein the aircraft window comprises a unique aircraft window identifier, said unique aircraft window identifier comprising at least one of a RFID chip and a part code, said method further comprising:
identifying a unique window identifier.

9. The method of claim 1, further comprising:
providing an accessible memory, said accessible memory in communication with the personal electronic device; and
storing the captured image of the aircraft window within the accessible memory.

10. The method of claim 1, wherein the image capturing device comprises a digital camera, said digital camera comprising at least one of a wide angle lens and an ultra-wide angle lens.

11. The method of claim 1, further comprising:
positioning the personal electronic device on the aircraft cabin fixture, said personal electronic device positioned on the aircraft cabin fixture at a selected distance from the aircraft window interior surface, said selected distance ranging from 0.5 to 6 inches.

12. An aircraft cabin fixture comprising:
an aircraft cabin fixture, said aircraft cabin fixture configured to receive a personal electronic device; and
a personal electronic device, said personal electronic device configured to face an adjacent aircraft window interior surface, said personal electronic device comprising an image capturing device, said image capturing device configured to face the aircraft window interior surface;
wherein said personal electronic device is configured to capture an image of the aircraft window to form a captured image of the aircraft window;
wherein said personal electronic device is configured to obtain aircraft window data from the captured image of the aircraft window;
wherein said aircraft window data comprises aircraft window anomaly data; and
wherein said aircraft window data is harvested from the aircraft window in situ.

13. The aircraft cabin fixture of claim 12, said personal electronic device comprising a digital camera, said digital camera comprising a wide angle lens.

14. The aircraft cabin fixture of claim 12, said aircraft cabin fixture comprising at least one of an aircraft passenger seat and an aircraft cabin monument.

15. The aircraft cabin fixture of claim 12, wherein at least a portion of said aircraft cabin fixture is configured to be positioned adjacent to an aircraft window interior surface, said personal electronic device configured to be positioned at a distance from the aircraft window interior surface, said distance from the aircraft window interior surface ranging from 0.5 inches to 6 inches.

16. The aircraft cabin fixture of claim 12, said image capturing device configured to capture a range of field of from 64 degrees to 120 degrees as measured from the image capturing device to the aircraft window interior surface.

17. The aircraft cabin fixture of claim 12, wherein said personal electronic device is attached to the aircraft cabin fixture.

18. The aircraft cabin fixture of claim 12, wherein said personal electronic device is integral with the aircraft cabin fixture.

19. An aircraft comprising:
an aircraft cabin, said aircraft cabin defined by an aircraft fuselage interior, said aircraft cabin comprising;
an aircraft window, said aircraft window comprising an aircraft window exterior surface and an aircraft window interior surface;
an aircraft cabin fixture, said aircraft cabin fixture comprising at least one of an aircraft passenger seat and an aircraft cabin monument, at least a portion of the aircraft cabin fixture configured to rest adjacent an aircraft window interior surface, said aircraft cabin fixture further configured to rest at a selected distance from the aircraft window interior surface, said selected distance configured to define an inspection space between aircraft cabin fixture and the aircraft window interior surface, said inspection space configured to accommodate a personal electronic device, said personal electronic device configured to face the adjacent aircraft window interior surface, said personal electronic device comprising an image capturing device, said image capturing device configured to face the aircraft window interior surface, said image capturing device comprising a digital camera;
wherein said personal electronic device is configured to capture an image of the aircraft window to form a captured image of the aircraft window to obtain aircraft window data from the captured image of the aircraft window;
wherein said aircraft window data comprises aircraft window anomaly data; and
wherein said aircraft window data is harvested from the aircraft window in situ.

20. The aircraft of claim 19, wherein at least a portion of said aircraft cabin fixture is configured to be positioned adjacent an aircraft window interior surface, said personal electronic device configured to be positioned within the inspection space.

21. The aircraft of claim 19, said image capturing device configured to capture a field of view ranging from 64 degrees to 120 degrees as measured from the image capturing device to the aircraft window interior surface.

22. The aircraft of claim 19, wherein said aircraft cabin fixture is configured to receive a personal electronic device.

23. The aircraft of claim 19, wherein said personal electronic device is attached to the aircraft cabin fixture.

24. The aircraft of claim 19, wherein said personal electronic device is integral with the aircraft cabin fixture.

25. The aircraft of claim 19, wherein, said personal electronic device configured to be positioned within the inspection space, said personal electronic device further configured to be positioned at a selected distance from the aircraft window interior surface, said selected distance ranging from 0.5 inches to 6 inches.

26. A method for harvesting aircraft window data from an aircraft window installed on an aircraft in situ, said aircraft window defining an aircraft window interior surface and an aircraft window exterior surface, the method comprising:
positioning an aircraft cabin fixture within an aircraft cabin, at least a portion of said aircraft cabin fixture positioned adjacent an aircraft window interior surface of an aircraft window, said aircraft cabin fixture further configured to rest at a selected distance from the aircraft window interior surface, said selected distance configured to define an inspection space between aircraft cabin fixture and the aircraft window interior surface, said inspection space configured to accommodate a personal electronic device, said personal electronic device configured to face the adjacent aircraft window interior surface, said personal electronic device comprising an image capturing device;
positioning the personal electronic device and the image capturing device to face the aircraft window interior surface;
activating the image capturing device, said image capturing device configured to capture a field of view ranging from 64 degrees to 120 degrees as measured from the image capturing device to the aircraft window interior surface;
capturing an image of the aircraft window to form a captured image of the aircraft window; and
obtaining aircraft window data from the captured image of the aircraft window;
wherein said aircraft window data comprises aircraft window anomaly data; and
wherein said aircraft window data is harvested from the aircraft window in situ.

27. The method of claim 26, further comprising:
storing the aircraft window data obtained from the captured image of the aircraft window in an accessible memory, said accessible memory in communication with the personal electronic device;
accessing the aircraft window data obtained from the captured image of the aircraft window from the accessible memory; and
analyzing the aircraft window data to detect an aircraft window anomaly in an aircraft window.

28. The method of claim 27, further comprising:
generating an aircraft window anomaly warning signal, said aircraft window anomaly warning signal generated in response to detecting an anomaly in the aircraft window; and
sending the aircraft window anomaly warning signal to a readout.

29. The method of claim 27 further comprising:
monitoring in real time an aircraft window.

30. The method of claim 27 further comprising:
determining in real time a change in a detected aircraft window anomaly.

31. A system for inspecting an aircraft window installed on an aircraft in situ, said aircraft window comprising an aircraft window interior surface and an aircraft window exterior surface, the system comprising:
an aircraft cabin fixture, said aircraft cabin fixture located within an aircraft cabin, said aircraft cabin fixture comprising at least one of an aircraft passenger seat and an aircraft cabin monument, at least a portion of the aircraft cabin fixture configured to rest adjacent an aircraft window interior surface of an aircraft window, said aircraft cabin fixture further configured to rest at a selected distance from the aircraft window interior surface, said selected distance configured to define an inspection space between aircraft cabin fixture and the aircraft window interior surface, said inspection space configured to accommodate a personal electronic device, said personal electronic device configured to face the adjacent aircraft window interior surface;
a personal electronic device comprising an image capturing device, said image capturing device configured to face the aircraft window interior surface, said image capturing device comprising a digital camera configured to capture an aircraft window image, said image capturing device configured to comprise a field of view ranging from 64 degrees to 120 degrees as measured from the image capturing device to the aircraft window interior surface; and
an analyzing subsystem in communication with the image capturing device, said analyzing subsystem operable to receive and analyze the aircraft window image;
wherein said image capturing device is configured to capture an image of the aircraft window to form a captured image of the aircraft window;
wherein said analyzing subsystem is configured to obtain aircraft window data from the captured image of the aircraft window;
wherein said aircraft window data comprises aircraft window anomaly data; and
wherein said aircraft window data is harvested from the aircraft window in situ.

* * * * *